(12) United States Patent
Morrisey, IV

(10) Patent No.: US 11,551,494 B2
(45) Date of Patent: Jan. 10, 2023

(54) PREDICTIVE MOBILE TEST DEVICE CONTROL FOR AUTONOMOUS VEHICLE TESTING

(71) Applicant: UATC, LLC, San Francisco, CA (US)

(72) Inventor: James William Morrisey, IV, Pittsburgh, PA (US)

(73) Assignee: UATC, LLC, Mountain View, CA (US)

(*) Notice: Subject to any disclaimer, the term of this patent is extended or adjusted under 35 U.S.C. 154(b) by 316 days.

(21) Appl. No.: 16/863,311

(22) Filed: Apr. 30, 2020

(65) Prior Publication Data

US 2021/0192874 A1 Jun. 24, 2021

Related U.S. Application Data

(60) Provisional application No. 62/952,819, filed on Dec. 23, 2019.

(51) Int. Cl.
*G07C 5/08* (2006.01)
*B60W 60/00* (2020.01)
*B60W 50/04* (2006.01)

(52) U.S. Cl.
CPC ....... *G07C 5/0858* (2013.01); *B60W 60/0011* (2020.02); *G07C 5/0808* (2013.01); *B60W 2050/046* (2013.01)

(58) Field of Classification Search
None
See application file for complete search history.

(56) References Cited

U.S. PATENT DOCUMENTS 4,318,346 A 3/1982 Sessum
4,690,584 A 9/1987 LeBaron
(Continued)

FOREIGN PATENT DOCUMENTS

CN 111179585 B * 12/2021 .......... G08G 1/0104
WO WO-2020238097 A1 * 12/2020

OTHER PUBLICATIONS

Z. Szalay, M. Szalai, B. Tóth, T. Tettamanti and V. Tihanyi, "Proof of concept for Scenario-in-the-Loop (SciL) testing for autonomous vehicle technology," 2019 IEEE International Conference on Connected Vehicles and Expo (ICCVE), 2019, pp. 1-5, doi: 10.1109/ICCVE45908.2019.8965086 (Year: 2019).*

(Continued)

*Primary Examiner* — Abdhesh K Jha
(74) *Attorney, Agent, or Firm* — Dority & Manning, P.A.

(57) ABSTRACT

Example aspects of the present disclosure are directed to improved systems and methods for testing autonomous vehicle operation through the use of mobile test devices that are controlled at least in part in response to predictive motion planning associated with autonomous vehicles. More particularly, the motion of a mobile test device can be controlled based on the motion plan of an autonomous vehicle to cause desired interactions between the mobile test device and the autonomous vehicle. Motion planning data associated with the autonomous vehicle can be obtained by an autonomous vehicle (AV) test system prior to the autonomous vehicle implementing or completely implementing a motion plan. In this manner, the AV test system can proactively control the mobile test device based on predictive motion planning data to facilitate interactions between the mobile test device and the autonomous vehicle that may not otherwise be achievable.

20 Claims, 15 Drawing Sheets

(56) References Cited

U.S. PATENT DOCUMENTS

| | | | |
|---|---|---|---|
| 5,474,266 | A | 12/1995 | Koglin |
| 6,050,198 | A | 4/2000 | Gersemsky et al. |
| 8,849,494 | B1 | 9/2014 | Herbach et al. |
| 9,541,410 | B1 | 1/2017 | Herbach et al. |
| 9,754,325 | B1 | 9/2017 | Konrardy et al. |
| 10,024,766 | B2 | 7/2018 | Botello et al. |
| 2002/0185031 | A1 | 12/2002 | Greeley |
| 2007/0239322 | A1 | 10/2007 | McQuade et al. |
| 2011/0220447 | A1 | 9/2011 | Schroder et al. |
| 2015/0142309 | A1 | 5/2015 | Sun et al. |
| 2015/0307112 | A1 | 10/2015 | Liu |
| 2016/0247331 | A1 | 8/2016 | Cacabelos et al. |
| 2017/0003199 | A1 | 1/2017 | Botello et al. |
| 2017/0132118 | A1 | 5/2017 | Stefan et al. |
| 2018/0267538 | A1 | 9/2018 | Shum et al. |

OTHER PUBLICATIONS

L. Li, W.-L. Huang, Y. Liu, N.-N. Zheng and F.-Y. Wang, "Intelligence Testing for Autonomous Vehicles: A New Approach," in IEEE Transactions on Intelligent Vehicles, vol. 1, No. 2, pp. 158-166, Jun. 2016, doi: 10.1109/TIV.2016.2608003. (Year: 2016).*

"4ActiveSystems", http://www.4activesystems.at/en/downloads.html, retrieved on Apr. 29, 2020, 19 pages.

"MCity fest Facility Driving Tour", https://www.youtube.com/watch?v=AU9oiaeaGH0, published on Jul. 21, 2017, retrieved on Nov. 26, 2019, 2 pages.

Piazza, "The Future of Mobility", https://research.umich.edu/future-mobility, Jul. 21, 2015, retrieved on Nov. 26, 2019, 5 pages.

* cited by examiner

PREDICTIVE MOBILE TEST DEVICE CONTROL FOR AUTONOMOUS VEHICLE TESTING

RELATED APPLICATION

This application claims priority to and the benefit of U.S. Provisional Patent Application No. 62/952,819 titled "Predictive Mobile Test Device Control for Autonomous Vehicle Testing," filed on Dec. 23, 2019. U.S. Provisional Patent Application No. 62/952,819 is hereby incorporated by reference herein in its entirety.

FIELD

The present disclosure relates generally to autonomous vehicles. More specifically, the present disclosure relates to improvements in testing autonomous vehicle operation through the use of a mobile testing device.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path for navigating through such surrounding environment.

SUMMARY

Aspects and advantages of embodiments of the present disclosure will be set forth in part in the following description, or may be learned from the description, or may be learned through practice of the embodiments.

One example of the present disclosure is directed to a computer-implemented method that includes obtaining, by one or more computing devices in a computing system, data indicative of a target interaction between an autonomous vehicle and a mobile test device in an environment. The method includes obtaining, by the computing system, motion data generated by an autonomy computing system of the autonomous vehicle while operating within the environment. The method includes determining, by the computing system, one or more motion parameters for the mobile test device based at least in part on the motion planning data and the data indicative of the target interaction. The method includes generating, by the computing system, one or more control commands for the mobile test device based at least in part on the one or more motion parameters.

Another example aspect of the present disclosure is directed to a computer system including a one or more processors and one or more non-transitory computer readable media that collectively store instructions that, when executed by one or more processors, cause the computing system to perform operations. The operations include obtaining data indicative of a target interaction between an autonomous vehicle and a mobile test device in an environment and obtaining motion planning data generated by an autonomy computing system of the autonomous vehicle while operating within the environment. Based at least in part on the motion planning data and the data indicative of the target interaction, the operations include determining one or more motion parameters for the mobile test device.

The operations further include generating one or more control commands for the mobile test device based at least in part on the one or more motion parameters.

Yet another example of the present disclosure is directed to a mobile test device for testing autonomous vehicle response to object movement that includes a device propulsion system, one or more communication interfaces, one or more processors, and one or more non-transitory computer-readable media that collectively store instructions that, when executed by the one or more processors, cause the one or more processors to perform operations. The operations include obtaining motion planning data generated by an autonomy computing system of an autonomous vehicle while operating within an environment, determining one or more motion parameters for the mobile test device based at least in part on the motion planning data, and providing one or more control signals to the device propulsion system based at least in part on the one or more motion parameters.

Other example aspects of the present disclosure are directed to systems, methods, vehicles, apparatuses, tangible, non-transitory computer-readable media, and memory devices for motion planning for autonomous driving.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
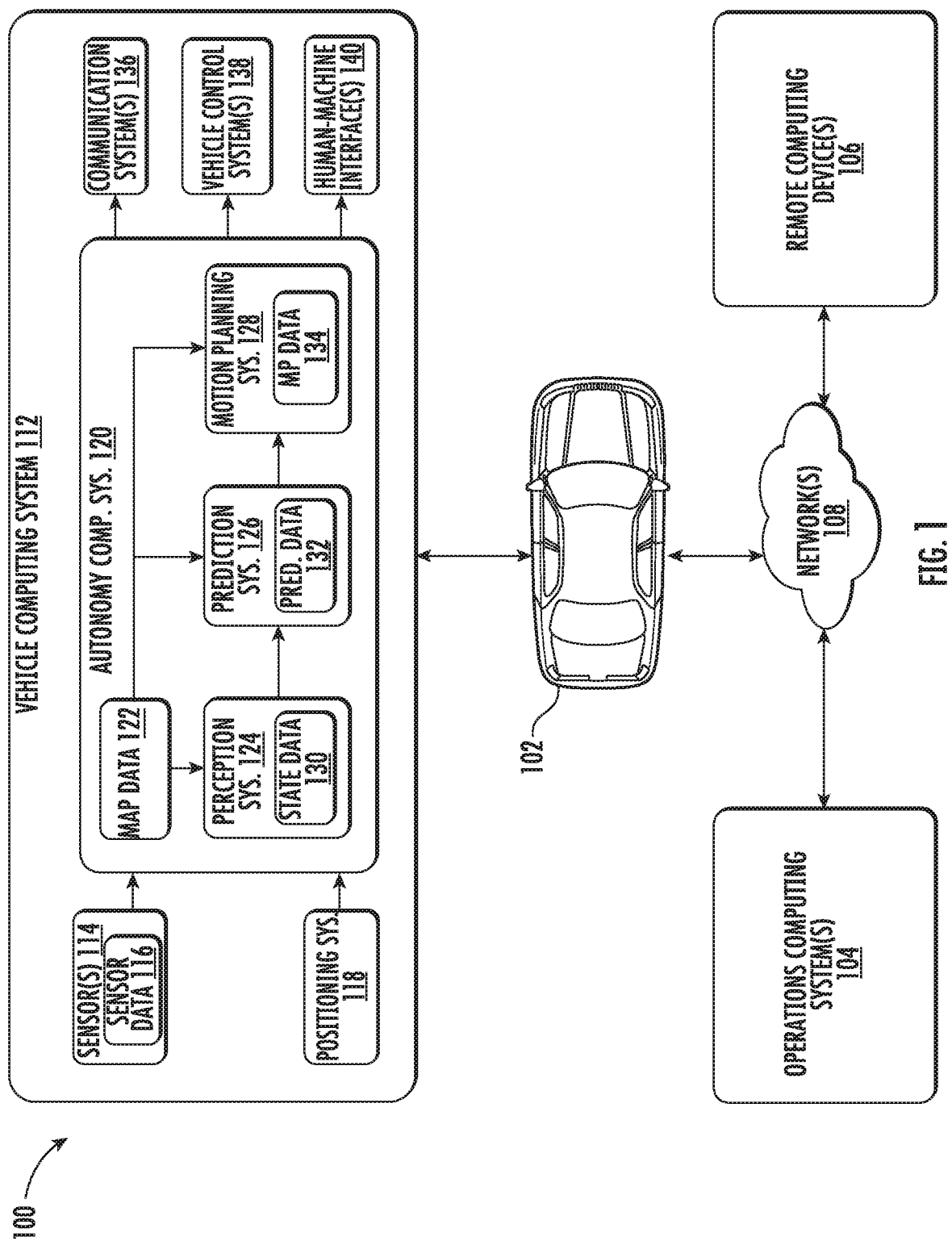
FIG. 1 depicts an example system overview including an autonomous vehicle according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for testing autonomous vehicle operation through the use of mobile test devices that are controlled at least in part in response to predictive motion planning associated with autonomous vehicles. More particularly, the motion of a mobile test device can be controlled based on the motion plan of an autonomous vehicle to cause desired interactions between the mobile test device and the autonomous vehicle. Motion planning data associated with the autonomous vehicle can be obtained by an autonomous vehicle (AV) test system prior to the autonomous vehicle implementing or completely implementing a motion plan. In this manner, the AV test system can proactively control the mobile test device based on predictive motion planning data to facilitate interactions between the mobile test device and the autonomous vehicle that may not otherwise be achievable. In particular, the AV test system can obtain motion planning data indicative of future movements of the autonomous vehicle and, in response, control the mobile test device to facilitate target interactions between the autonomous vehicle and the mobile test device. For instance, control commands associated with a drive propulsion system of the mobile test device can be generated by the AV test system in response to AV motion planning data. This process can occur in real-time such that the mobile test device motion is modified as the AV motion plan is updated. In this manner, the AV test system can respond to predictive data associated with the autonomous vehicle to generate desired interactions between the mobile test device and the autonomous vehicle.

By utilizing predictive data, such as data representing a candidate motion plan that an autonomous vehicle may execute in the future, test systems in accordance with example embodiments can more effectively control a mobile test device to interact with the autonomous vehicle. The motion of the mobile test device can be controlled in response to anticipated movements by the autonomous vehicle as represented in the predictive motion planning data associated with the autonomous vehicle. This may be contrasted with approaches that rely solely on sensor data representative of measured attributes of a vehicle, and thus, that can only act in a reactive manner to detected movements after they occur. By utilizing predictive data, a test system in accordance with example embodiments can control a mobile test device so as to respond to the anticipated movements of an autonomous vehicle before they occur. This approach can provide improved control of the mobile test device when compared with approaches that provide control based on measured movements of autonomous vehicles after they occur. A mobile test device can initiate interactions that may not be achievable based on measured data alone. Additionally, or alternatively, the test system can validate one or more portions of an autonomous vehicle by analyzing motion planning data that is generated in response to target interactions. In this manner, the test system can validate predictive motion plans generated by the autonomous vehicle, in addition to or in place of the validation of actual movements or motions of the autonomous vehicle itself.

According to example aspects of the disclosed technology, an autonomous vehicle (AV) test system can evaluate an autonomous vehicle based on a target interaction with a mobile test device. The AV test system can obtain data indicative of a target interaction between an autonomous vehicle and a mobile test device. Additionally, the AV test system can obtain motion planning data associated with the autonomous vehicle as the autonomous vehicle operates within an environment. The motion planning data can include predictive data indicating one or more motion plans that may be executed by the autonomous vehicle in the future. As such, the motion planning data may be contrasted with simple measurement data that may be generated by sensors and that is indicative of a current state of the autonomous vehicle. The motion planning data can indicate one or more motion plans that the autonomous vehicle may execute in the future, rather than indicate a current velocity, heading, etc. associated with the vehicle. Based on the motion planning data and the target interaction between the mobile test device and the autonomous vehicle, the test system can determine one or more motion parameters for the mobile test device. The motion parameters can indicate one or more motions that the mobile test device should perform in order to achieve the target interaction with the autonomous vehicle based on the motion planning data. For example, the motion parameters may indicate that the mobile test device should speed up, slow down, turn, etc. in order to arrive at a target interaction point at a target interaction time. By analyzing the motion planning data of the autonomous vehicle, the test system can generate appropriate motion parameters in anticipation of the future motion of the autonomous vehicle. In this manner, the test system can more accurately cause an occurrence of a target interaction.

A mobile test device in accordance with example embodiments can be implemented as a robotic mobile platform that can be controlled using manual radio communication, GPS guidance, and/or by recording movements of the mobile test device and playing back those movements at a future time. In some examples, a mobile test device may be referred to as a test roamer device. The mobile test device can transport one or more proxies which can include representations of real-world actors that can interact with machine-learned classification models of a perception system of an autonomous vehicle, for example. By way of example, the mobile test device can transport proxies such as representations of pedestrians, bicycles, bicycle riders, bicycle walkers, animals, or any other object. The mobile test device can collect data such as GPS points and/or timestamps that can be used to determine the ground truth of an actor, perform cross-track validation, perform long track validation, and/or perform velocity validation. Mobile test devices can be desirable for autonomous vehicle testing as they can remove human actors from testing scenarios and provide repeatability to compare performance against older implementations of systems. Additionally, mobile test devices can provide accuracy to test specific conditions and compare reality to simulations. In some examples, an AV test system can include multiple distributed components such as laser emitters, reflectors, relays, and/or other components to accurately determine the position of the mobile test device and to accurately control its position with an environment. Numerous types of systems may be utilized to control the mobile test device.

In accordance with example embodiments, an autonomous vehicle test system can determine one or more motion parameters for the mobile test device using motion planning data for an autonomous vehicle and data indicative of a target interaction. For instance, the AV test system can determine one or more interaction points (e.g., GPS coordinates of geographic locations) for a target interaction between the autonomous vehicle and the mobile test device. In some instances, the interaction point can be defined as part of the target interaction. In other examples, the interaction points can be determined in response to a target interaction. For example, the test system can determine one or more interaction points along an autonomous vehicle path at which a target interaction is to occur. The AV test system can determine a target interaction time for the target interaction at the interaction point(s) using motion planning data from the autonomous vehicle. Based on the autonomous vehicle's motion plan, the test system can determine a time at which mobile test device should be positioned for the target interaction with the autonomous vehicle at the one or more interaction points. The AV test system can determine a motion trajectory for the mobile test device using the interaction points and the target interaction time. For example, the AV test system can determine a route or path for the mobile test device, a speed and/or acceleration for the mobile test device, and/or orientation or other motion parameters for the mobile test device during the target interaction.

The AV test system can obtain data indicative of a target interaction from various sources. By way of example, the AV test system can obtain target interaction data from a remote computing system and/or can generate the target interaction data locally. The data indicative of the target interaction can include data indicative of one or more interaction points, such as one or more geographic locations for a target interaction. In some examples, the data can additionally include data associated with the mobile test device for the target interaction. By way of example, the target interaction data can include data indicative of motion attributes for the mobile test device, such as that the mobile test device should maintain a constant velocity, speed up, stop, turn, etc. as part of the target interaction. The target interaction data can additionally or alternatively indicate an orientation or other state information associated with the mobile test device during the target interaction. In some embodiments, data indicative of a target interaction can be received from one or more users, such as one or more operators associated with the AV test system. For instance, an operator may provide one or more inputs to a computing device as part of a process to define a target interaction and generate data indicative of such interaction. A user may provide one or more inputs to define a target interaction including a geographic location, velocity, or other state information associated with the mobile test device, path information, motion trajectory information etc. A user can provide one or more inputs to set a velocity, acceleration, to trigger a delay, to trigger a proxy movement, etc. In some examples, a target interaction can be predefined or at least partially predefined. For example, an operator can provide an input to select a predefined interaction and then optionally modify the target interaction. In some instances, a radio control device such as a controller, joystick or other input device can be used to manually control a mobile test device.

Consider an example of a target interaction between an autonomous vehicle executing a right-hand turn at an intersection having a crosswalk that is perpendicular to the direction of traffic into which the autonomous vehicle is making the right turn. A mobile test device may be equipped with a proxy representing a person, bicycle, or other object that is to utilize the crosswalk to cross the street. In other examples, a proxy may not be used. The AV test system can define a target interaction between the autonomous vehicle and the mobile test device at one or more interaction points corresponding to the crosswalk. In order to test the autonomous vehicle, the target interaction can be designed such that the mobile test device is to cross a planned path for the autonomous vehicle. Notably, the autonomous vehicle motion planning data can be utilized to control the motion of the mobile test device along a path that will cross with a planned future location of the autonomous vehicle according to its own motion planning data. Moreover, the mobile test device can be controlled using the motion planning data so as to force the target interaction between the autonomous vehicle and the mobile test device. By using predictive motion planning data, the vehicle test system may be able to control the mobile test device to force target interactions that may not be achievable if such predictive data were not used. For example, if sensor data indicative of measured parameters alone were used, the mobile test device may not be able to react quickly enough to force last-minute target interactions, such as a user walking directly in front of an autonomous vehicle. If measured data alone is used, the autonomous vehicle may be able to react sufficiently in advance to stop or otherwise avoid the mobile test device altogether. By contrast, the motion planning data may be used by the test system to cause the mobile test device to adjust its motion and cause a last-minute interaction in order to examine how the autonomous vehicle reacts.

According to some example aspects of the present disclosure, an autonomous vehicle test system can utilize motion planning data from an autonomous vehicle to update the motion of a mobile test device in order to execute a target interaction. For example, the test system can modify the path, speed, acceleration, orientation, or other state of the mobile test device in response to motion planning data of the autonomous vehicle. Continuing with the earlier example of an autonomous vehicle executing a right-hand turn, the motion plan of the autonomous vehicle may be modified as the autonomous vehicle executes the right-hand turn. For instance, the autonomous vehicle may begin on a first path to make the right-hand turn but then adjust its path as it executes the turn. The test system can receive the motion planning data indicative of the altered path of the autonomous vehicle prior to the autonomous vehicle executing the altered path. As such, the test system can generate updated motion parameters for the mobile test device so that the mobile test device still achieves the target interaction at the crosswalk.

As a specific example, consider an example where the AV test system obtains data indicative of a first motion plan prior to the autonomous vehicle executing the first motion plan. Similarly, the test system can receive data indicative of a second motion plan prior to the autonomous vehicle executing the second motion plan. The first motion plan data can be received by the AV test system prior to the second motion plan data. In response to the first motion plan data, the AV test system can determine a first set of motion parameters for the mobile test device in order to achieve a target interaction. The first set of motion parameters can be based at least in part on the first motion plan for the autonomous vehicle. Notably, the test system can determine the first set of motion parameters for the mobile test device prior to the autonomous vehicle executing the first motion plan. For example, the AV test system can obtain data indicative of the first motion plan prior to the autonomous vehicle beginning and/or completing the execution of the first motion plan. The test system can then generate the first set of motion parameters prior to the autonomous vehicle actually beginning or completing the motion plan. In response to receiving data indicative of the second motion plan, the AV test system can modify or otherwise update the motion of the mobile test device to achieve the target interaction. The AV test system can generate a second set of motion parameters that are based at least in part on the second motion plan for the autonomous vehicle. As with the first set of motion parameters, the test system can determine the second set of motion parameters for the mobile test device prior to the autonomous vehicle executing the second motion plan.

In accordance with example embodiments, motion planning data can include data indicative of one or more motion plans associated with the autonomous vehicle. In example embodiments, the motion plans can be candidate motion plans that may be potentially executed by the autonomous vehicle, but that are not necessarily executed. For instance, the motion planning data may include multiple candidate motion plans that the autonomous vehicle may execute in the future. In some examples, each candidate motion plan can be associated with a probability or other measure of likelihood that the autonomous vehicle will execute the candidate motion plan. For instance, an autonomous vehicle may generate four candidate motion plans associated with a future time. The four candidate motion plans may each be associated with an individual probability of occurrence. For instance, at a first time in advance of the future time event, the candidate motion plans may include or otherwise be associated with a first set of probabilities (e.g., 25% each). As the current time becomes closer to the future time event and the system narrows in on a more likely motion plan, the set of probabilities may be updated (e.g., 10%, 10%, 10%, 70%).

In accordance with example embodiments, the AV test system can control a mobile test device based on motion planning data that is indicative of multiple candidate motion plans. For example, the AV test system can utilize one or more threshold criteria to determine whether to update and/or generate motion parameters for the mobile test device based on motion planning data. If a motion plan has a probability that is less than a threshold, for example, the AV test system may forego an update to the motion parameters for the mobile test device. If a motion plan has a probability above the threshold, however, the AV test system can determine that the motion plan has a sufficient likelihood of occurring that the mobile test device should adjust its motion in order to achieve the desired target interaction. Accordingly, the AV test system can generate an updated set of motion parameters and provide one or more control commands to the mobile test device based on the updated motion parameters. The AV test system can react to multiple candidate motion plans in other manners in example embodiments.

Autonomous vehicle motion planning data can additionally or alternatively be used to validate the reaction of an autonomous vehicle to a target interaction. More particularly, the test system can analyze predictive data generated by the autonomous vehicle in response to a target interaction to validate the autonomous vehicle's reaction to the target interaction. By way of example, the test system can analyze motion planning data generated in response to a mobile test device crossing a pathway that the autonomous vehicle is to cross. As such, the test system can not only test whether the autonomous vehicle actually stops in response to the target interaction but can more granularly analyze the motion plan generated by the autonomous vehicle in response to the target interaction.

An autonomous vehicle test system can include one or more computing devices in example embodiments. By way of example, an AV test system can be implemented as a standalone computing system that is separate from the autonomous vehicle and the mobile test device in example embodiments. In other examples, however, at least a portion of the AV test system can include or be implemented as part of the autonomous vehicle and/or mobile test device. For instance, one or more portions of an AV test system can be included within an autonomous vehicle as an integrated part of the autonomy computing system or as a separate computing system from the autonomy computing system. In another example, one or more portions of an AV test system can be included within a mobile test device as an integrated part of the mobile test device control system or as a separate computing system from the mobile test device control system.

An autonomous vehicle test system in accordance with example embodiments can generate control commands for a mobile test device based on motion parameters that are determined in response to the motion planning data of an autonomous vehicle. In some instances, the AV test system can transmit the one or more control commands to a mobile test device, such as where the AV test system is remote from the mobile test device. In other examples, the AV test system can issue control commands directly to the mobile test device, such as where the AV test system is at least partially included within the mobile test device. The mobile test device can provide control signals to control devices of the mobile test device based on the control commands. For example, a control signal to increase the velocity of the mobile test device can be provided to the drive propulsion system in response to a control command indicative of a particular target velocity for the mobile test device.

In example embodiments, a mobile test device can include one or more communication interfaces such as a radio communications transceiver, cellular transceiver, and/ or global positioning system (GPS) transceiver. A mobile test device or test roamer device can include a drive propulsion system in order to move the test roamer device within an environment. The drive propulsion system can include one or more wheels or other locomotive components which are driven by one or more motors in example embodiments. In some instances, a mobile test device can include a plurality of wheels which are independently controlled using servomotors. The mobile test device can include a controller such as a control module implemented using one or more computing devices on the mobile test device. The computing device(s) can include a general processor or application-specific circuit in example embodiments. The mobile test device can communicate with the AV test system and/or autonomous vehicle over one or more networks such as mesh networks, Wi-Fi networks, cellular networks, Bluetooth networks, and the like.

In some examples, a mobile test device can include a chassis that at least partially encloses a plurality of electronics that are used to control the mobile test device. The mobile test device can include a power distribution component configured to provide power to the various electronics onboard the mobile test device. The mobile test device can include one or more drive wheels configured to cause movement of the mobile test device relative to a surface. One or more steering modules may be provided on the mobile test device to control the direction of travel. The mobile test device can include a cover or other interface for coupling with a proxy. One or more electronic speed control modules can be included in example embodiments. The mobile test device can include a controller such as a control module implemented using one or more processors or application-specific integrated circuits. A real-time kinematic positioning system can be utilized to enhance positioning data received from a global positioning system. The communication interfaces can include a global positioning system antenna in example embodiments. One or more transceiver modules can be included within the mobile test device. In some examples, a disable control switch can be provided.

The systems and methods of the present disclosure provide a number of technical effects and benefits, particularly in the areas of autonomous vehicles, mobile test devices, and computing technology. An autonomous vehicle test computing system in accordance with embodiments of the disclosed technology may control a mobile test device such as a mobile test device based at least in part on motion planning data associated with an autonomous vehicle. In this manner, the AV test system can control the mobile test device based on predictive data associated with the autonomous vehicle in addition to or in place of measured data associated with a current state of the autonomous vehicle. The motion planning data can represent predictive data indicative of one or more future actions of the autonomous vehicle. By accessing such data, the AV test system can proactively generate motion parameters for the mobile test device based on anticipated movements of the autonomous vehicle prior to such movements actually occurring. Such a technique can enable the AV test system to design, monitor, and evaluate target interactions that may not be possible without the consideration of such predictive data. For example, a reliance on measured sensor data alone may limit a test system to controlling a mobile test device reactively in response to a measured state of the autonomous vehicle. By contrast, the utilization of motion planning data can allow the AV test system to proactively maneuver a mobile test device in anticipation of future movements of the autonomous vehicle. In situations unique to autonomous vehicles which predictively react to external movements, the utilization of predictive data can enable a test system to cause or otherwise force interactions that an autonomous vehicle may successfully avoid altogether if the mobile test device behaves in a reactive manner only. For instance, if measured data is utilized alone, an AV test system may not have enough time to react to autonomous vehicle movements in order to achieve a target interaction with a mobile test device. By contrast, accessing motion planning data in order to generate motion parameters for a mobile test device can enable the AV test system to force interactions that may otherwise be unachievable.

In some example embodiments, predictive data such as motion planning data can be utilized to validate operations of an autonomous vehicle. Motion planning data, for example, can be analyzed to determine the manner in which an autonomous vehicle plans a response to a target interaction with a mobile test device. Such predictive data can be analyzed in addition to or alternatively from measured data indicative of how the autonomous vehicle actually performs. As such, the AV test system can more granularly examine how an autonomous vehicle plans a response to target interactions. In this manner, the AV test system can validate an autonomous vehicle based on motion planning performed in response to a target or action with a mobile test device, not just validate whether or not the autonomous vehicle interacts with the mobile test device.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing systems 106; a communication network 108; a vehicle computing system 112; one or more autonomy system sensors 114; autonomy sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing systems 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing systems 106 can include one or more processors and one or more memory devices. The one or more memory devices can be used to store instructions that when executed by the one or more processors of the one or more remote computing systems 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing systems 106 can communicate (e.g., exchange data and/or signals) with one or more devices including the operations computing system 104 and the vehicle 102 via the communications network 108.

The one or more remote computing systems 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing systems 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing systems 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing system 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around an vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing systems 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing system 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a back-passenger seat).

Figure 2:
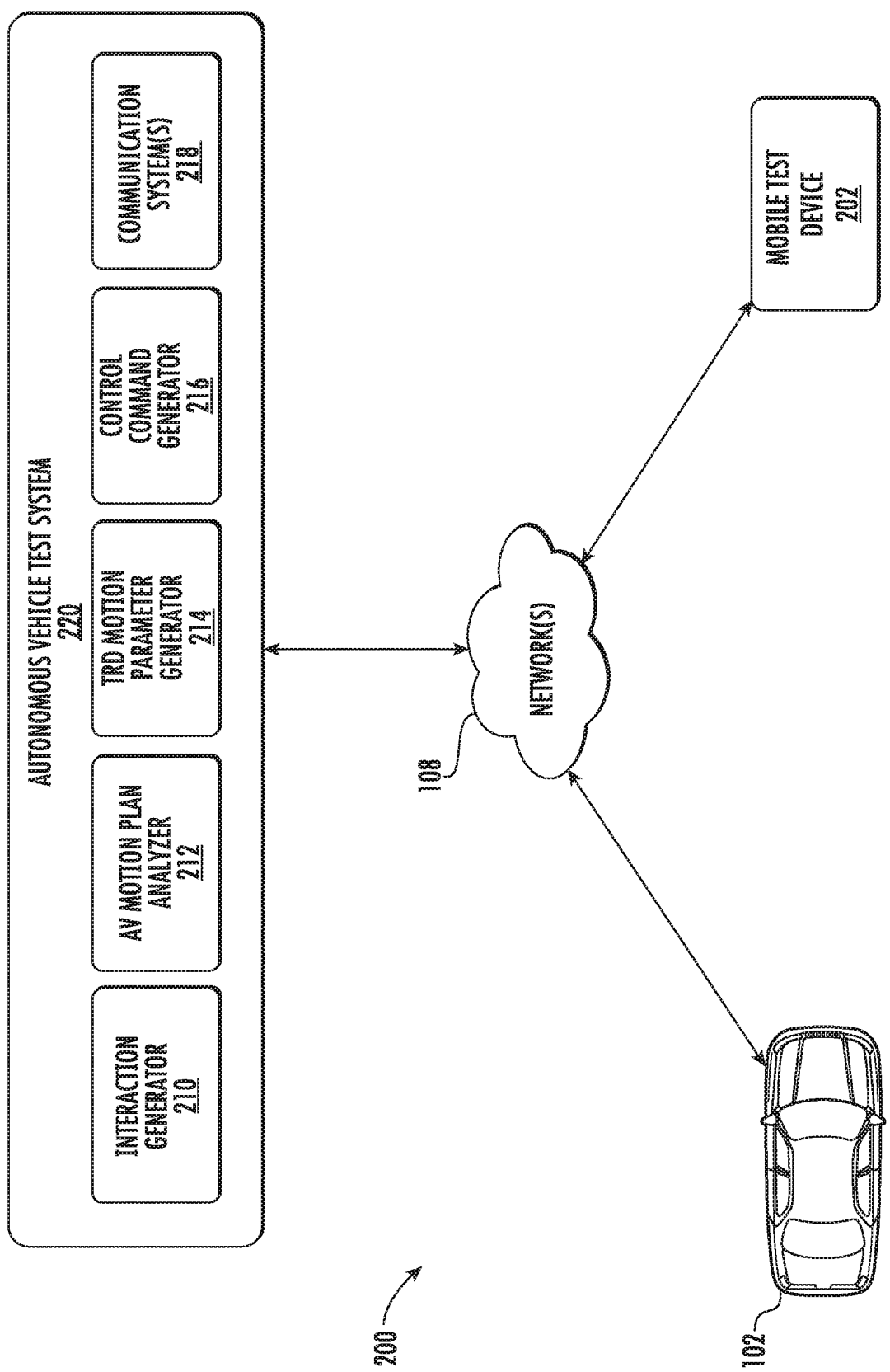
FIG. 2 depicts an example system overview including a mobile test device and an autonomous vehicle test computing system according to example embodiments of the present disclosure.

FIG. 2 depicts an example system overview including a mobile test device 202 and an autonomous vehicle test computing system 220 according to example embodiments of the present disclosure.

The system 200 can include a vehicle 102. The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

The system 200 can include a mobile test device 202. The mobile test device can include one or more components such as a chassis, a control module, one or more power distribution components, one or more drive wheels, one or more steering modules, one or more interfaces for coupling with a proxy, one or more electronic speed control modules, a controller, a real time kinetic positioning system, one or more global positioning system antennae, a driver module comprising a plurality of wheels, a drive propulsion system, a communication interface, and one or more handles to physically interact with the mobile test device. The mobile test device 202 can include one or more communication interfaces such as a radio communications transceiver, cellular transceiver, and/or global positioning system (GPS) transceiver. The mobile test device 202 can include a controller such as a control module implemented using one or more computing devices on the mobile test device. The number and configuration of elements shown in the figures is not meant to be limiting. More or less of those elements and/or different configurations can be utilized in various embodiments.

The system 200 can include an autonomous vehicle test system 220 that can be configured to generate control commands for a mobile test device 202 to execute a target interaction. In some examples, the autonomous vehicle test system 220 can be configured to validate one or more portions or operations of an autonomous vehicle 102 by analyzing motion planning data that is generated in response to target interactions.

The autonomous vehicle test system 220 can include an interaction generator 210. The interaction generator 210 can be configured to generate or define target interactions between the autonomous vehicle 102 and the mobile test device 202. For instance, the interaction generator 210 can be configured to determine one or more interaction points (e.g., GPS coordinates of geographic locations) for a target interaction between the autonomous vehicle 102 and the mobile test device 202. In some examples, the interaction generator 210 can be configured to define the interaction point as part of the target interaction. In other examples, the interaction generator 210 can be configured to determine the interaction points in response to a target interaction. For example, the interaction generator 210 can determine one or more interaction points along the path of the autonomous vehicle 102 at which a target interaction is to occur. In yet another example, the interaction generator 210 can determine a target interaction time for the target interaction at the interaction point(s) using motion planning data from the autonomous vehicle 102. In some examples, the interaction generator 210 can obtain one or more inputs from an operator or a user as part of a process to define a target interaction and generate data indicative of such interaction. The interaction generator 210 can be configured to obtain one or more inputs to set a velocity, acceleration, to trigger a delay, to trigger a proxy movement, etc. In some examples, interaction generator 210 can be configured to generate a predefined or partially predefined target interaction. For example, an operator or user can provide an input to select a predefined interaction and then optionally modify the target interaction.

The autonomous vehicle test system 220 can include an autonomous vehicle motion plan analyzer 212 configured to analyze motion planning data from an autonomous vehicle 102 to update the motion of a mobile test device 202 in order to execute a target interaction. The motion plan analyzer 212 can be configured to receive the motion planning data of the autonomous vehicle 102 and generate an appropriate motion plan for the mobile test device 202 in anticipation of the future motion of the autonomous vehicle 102. For example, the autonomous vehicle 102 may begin on a first path but then adjust its path as it executes its motion plan. The motion plan analyzer 212 can receive the motion planning data indicative of the altered path of the autonomous vehicle 102 prior to the autonomous vehicle 102 executing the altered path. As such, the motion plan analyzer 212 can update the motion of the mobile test device 202 so that the mobile test device still achieves the target interaction.

The autonomous vehicle test system can include a motion parameter generator 214 configured to generate motion parameters associated with the mobile test device 202. The motion parameter generator 214 can be configured to determine one or more motion parameters associated with the mobile test device 202 using motion planning data for an autonomous vehicle 102 and data indicative of a target interaction. The motion parameter generator 214 can be configured to update motion parameters associated with the mobile test device 202 in response to motion planning data associated with the autonomous vehicle 102.

The autonomous vehicle test system can include a control command generator 216 configured to generate control commands to operate the mobile test device. The control command generator 216 can be configured to generate one or more control commands for the mobile test device 202 based at least in part on the one or more motion parameters associated with the mobile test device 202. For example, the control command generator 216 can be configured to generate control commands to increase the speed of the mobile test device 202 based in part on updated motion parameters that are determined in response to the motion planning data associated with an autonomous vehicle 102. The control command generator 216 can be configured to provide control signals to control devices of the mobile test device 202 based on the control commands. For example, a control signal to increase the velocity of the mobile test device 202 can be provided to the drive propulsion system in response to a control command indicative of a particular target velocity for the mobile test device 202.

The autonomous vehicle test system can include a communication system 218 configured to transmit data between autonomous vehicle test system 220, the autonomous vehicle 102 and the mobile test device 202 over network 108. The communication system 218 can include one or more communication interfaces such as a radio communications transceiver, cellular transceiver, and/or global positioning system (GPS) transceiver. The communication system 218 can be configured to facilitate communication of the mobile test device with the autonomous vehicle test system 220 and/or autonomous vehicle 102 over one or more networks 108 such as mesh networks, Wi-Fi networks, cellular networks, Bluetooth networks, and the like. In some instances, communication system 218 can be configured to transmit the one or more control commands to a mobile test device 202, such as where the autonomous vehicle test system 220 is remote from the mobile test device. In other examples, the communication system 218 can be configured to issue control commands directly to the mobile test device 202, such as where the autonomous vehicle test system 220 is at least partially included within the mobile test device.

Figure 3:
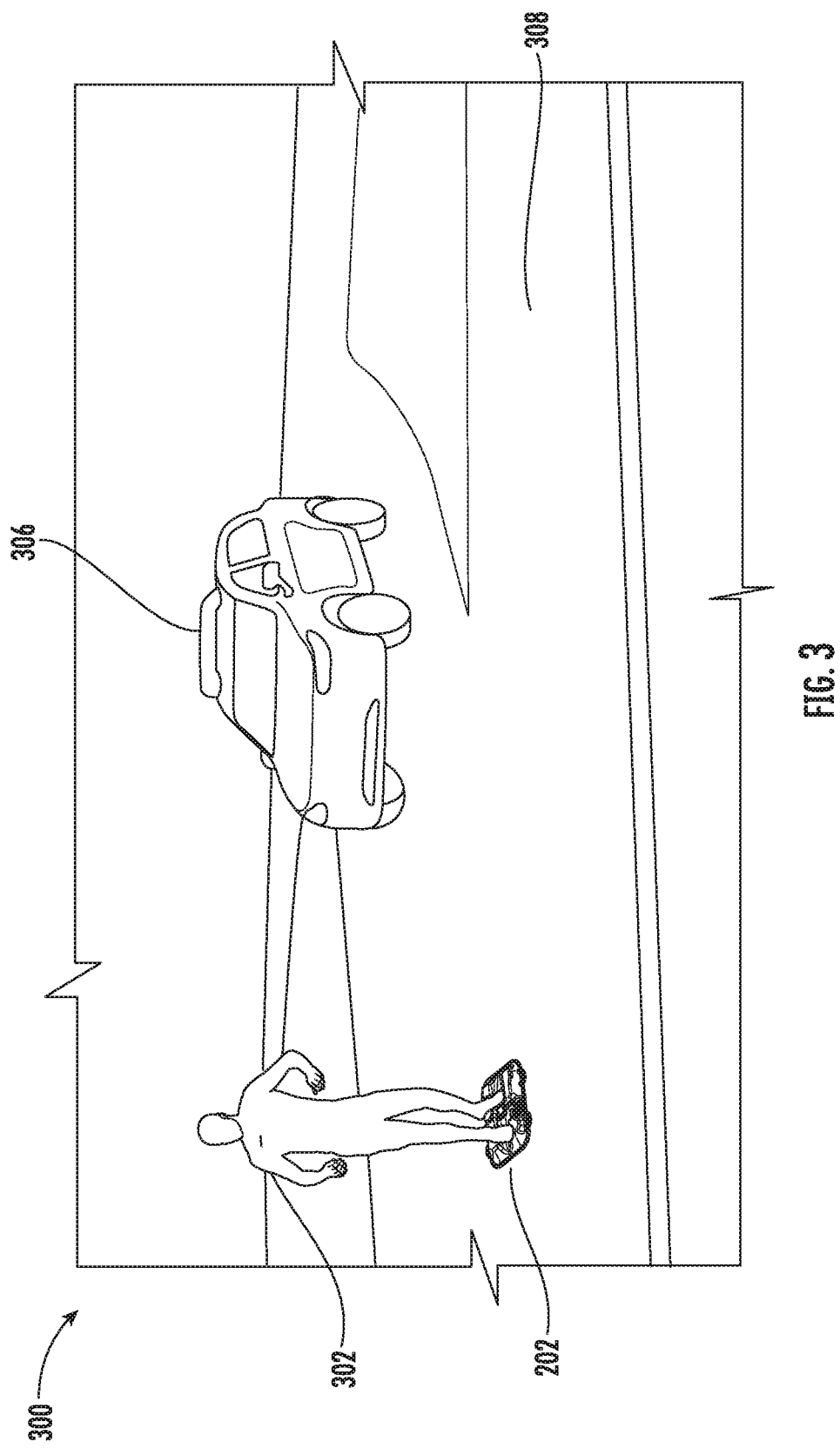
FIG. 3 depicts an example interaction between a mobile test device and an autonomous vehicle according to example embodiments of the present disclosure.

FIG. 3 depicts an example interaction 300 between a mobile test device and an autonomous vehicle according to example embodiments of the present disclosure. In some examples, the motion of a mobile test device 202 can be controlled based on the motion plan of an autonomous vehicle 302 to cause desired interactions between the mobile test device and the autonomous vehicle as the autonomous vehicle 302 operates within an environment 308. For example, motion planning data associated with the autonomous vehicle 302 can be obtained by an autonomous vehicle test system 220 prior to the autonomous vehicle 302 implementing or completely implementing a motion plan such that the autonomous vehicle test system 220 can proactively control the mobile test device 202 based on predictive motion planning data to facilitate interactions between the mobile test device 202 and the autonomous vehicle 302 that may not otherwise be achievable. As an example, the autonomous vehicle test system 220 can transmit one or more control commands to the mobile test device 202 to modify the path, speed, acceleration, orientation, or other state of the mobile test device 202 in response to motion planning data of the autonomous vehicle 306.

Figure 4:
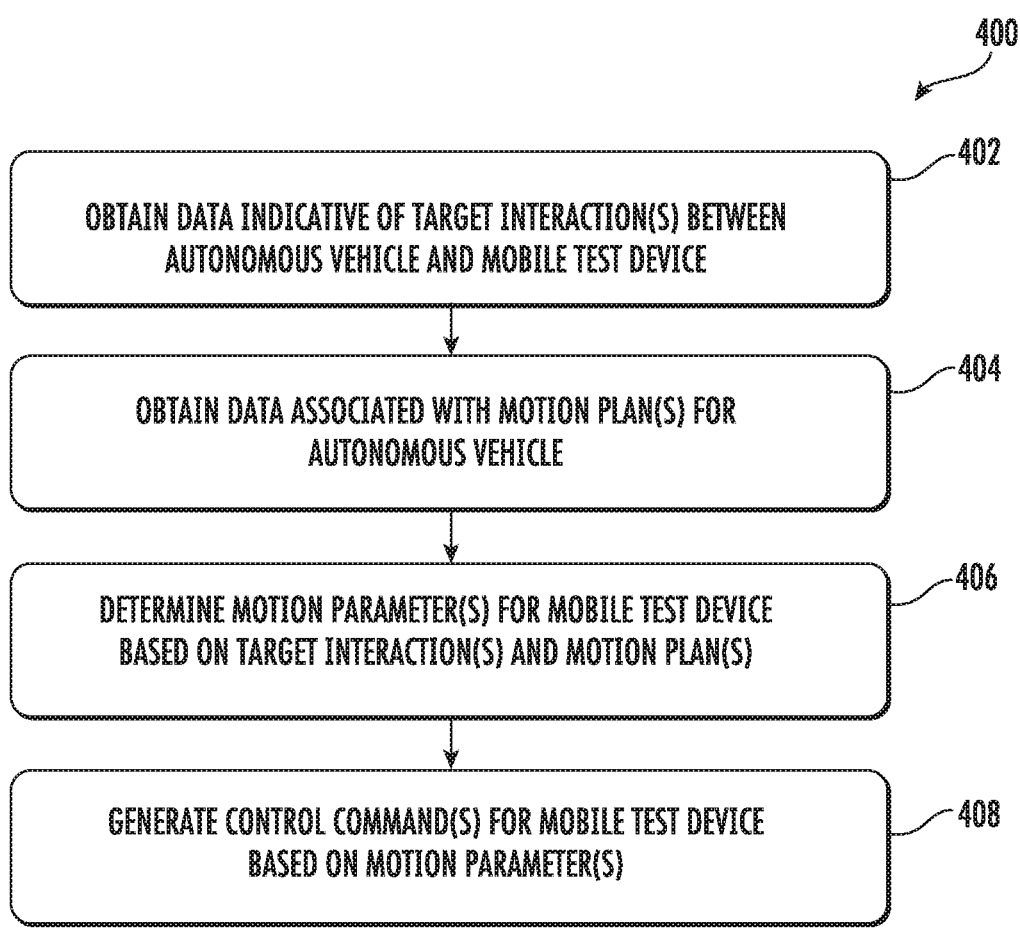
FIG. 4 is a flowchart diagram depicting an example process of generating control commands for a mobile test device based on data associated with one or more motion plans for an autonomous vehicle according to example embodiments of the present disclosure.

FIG. 4 is a flowchart diagram depicting an example method 400 of generating control commands for a mobile test device based on data associated with one or more motion plans for an autonomous vehicle according to example embodiments of the present disclosure. One or more portion(s) of the operations of method 400 and other methods described herein (e.g., methods 700 and 800) can be implemented by one or more computing systems that include, for example, a vehicle computing system (e.g., vehicle computing system 112, etc.), one or more portions of an operations computing system (e.g., operations computing system 104, etc.), one or more remote computing systems (e.g., remote computing system 106), autonomous vehicle test system 220, autonomous vehicle test computing system 1300, computing system 1002, computing system 1030, mobile test device 202 and/or one or the like. Each respective portion of the methods described herein can be performed by any (or any combination) of the computing device(s) of the respective computing system. Moreover, one or more portion(s) of the methods described herein can be implemented as an algorithm on the hardware components of the device(s) described herein (e.g., as in FIGS. 1, 2, 3, 9, 10, 11, 12, and 14). For example, method 400 can be implemented as an algorithm, for example, on mobile test device 202 and/or autonomous vehicle 102. In example embodiments, method 400 may be performed by an autonomous vehicle test system 220, operations computing system 104, and/or vehicle computing system 112. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 402, method 400 includes obtaining data indicative of a target interaction between an autonomous vehicle and a mobile test device from one or more sources. For example, the autonomous vehicle test system can obtain target interaction data from a remote computing system and/or can generate the target interaction data locally. The data indicative of the target interaction can include data indicative of one or more interaction points, such as one or more geographic locations for a target interaction. In some examples, the data indicative of the target interaction can alternatively or additionally include data associated with the mobile test device for the target interaction. In some examples, the data indicative of the target interaction can include data indicative of motion attributes for the mobile test device, such as that the mobile test device should maintain a constant velocity, speed up, stop, turn, etc. as part of the target interaction. The data indicative of the target interaction can additionally or alternatively indicate an orientation or other state information associated with the mobile test device during the target interaction. In some embodiments, data indicative of a target interaction can be received from one or more users, such as one or more operators associated with the autonomous vehicle test system. For instance, an operator or a user may provide one or more inputs to a computing device as part of a process to define a target interaction and generate data indicative of such interaction. A user may provide one or more inputs to define a target interaction including a geographic location, velocity, or other state information associated with the mobile test device, path information, motion trajectory information etc. A user can provide one or more inputs to set a velocity, acceleration, to trigger a delay, to trigger a proxy movement, etc. In some examples, a target interaction can be predefined or at least partially predefined. For example, an operator can provide an input to select a predefined interaction and then optionally modify the target interaction.

At 404, method 400 includes obtaining data associated with one or more motion plans (motion planning data) for the autonomous vehicles as the autonomous vehicle operates within an environment. The motion planning data can include predictive data indicating one or more motion plans that may be executed by the autonomous vehicle in the future. The motion planning data can include data indicative of one or more motion plans associated with the autonomous vehicle. In example embodiments, the motion plans can be candidate motion plans that may be potentially executed by the autonomous vehicle, but that are not necessarily executed. In some examples, each candidate motion plan can be associated with a probability or other measure of likelihood that the autonomous vehicle will execute the candidate motion plan.

At 406, method 400 includes determining one or more motion parameters for the mobile test device based on the motion planning data and the target interaction between the mobile test device and the autonomous vehicle. The motion parameters can indicate one or more motions that the mobile test device should perform in order to achieve the target interaction with the autonomous vehicle based on the motion planning data. For example, the motion parameters may indicate that the mobile test device should speed up, slow down, turn, etc. in order to arrive at a target interaction point at a target interaction time.

At 408, method 400 includes generating control commands for the mobile test device based on motion parameters that are determined in response to the motion parameters associated with the mobile test device. In some examples, the method 400 includes generatingcontrol commands for a mobile test device based on motion parameters that are determined in response to the motion planning data of an autonomous vehicle. In some instances, the autonomous vehicle test system can transmit the one or more control commands to a mobile test device, such as where the autonomous vehicle test system is remote from the mobile test device. In other examples, the autonomous vehicle test system can issue control commands directly to the mobile test device, such as where the autonomous vehicle test system is at least partially included within the mobile test device. The mobile test device can provide control signals to control devices of the mobile test device based on the control commands. For example, a control signal to increase the velocity of the mobile test device can be provided to the drive propulsion system in response to a control command indicative of a particular target velocity for the mobile test device.

Figure 5:
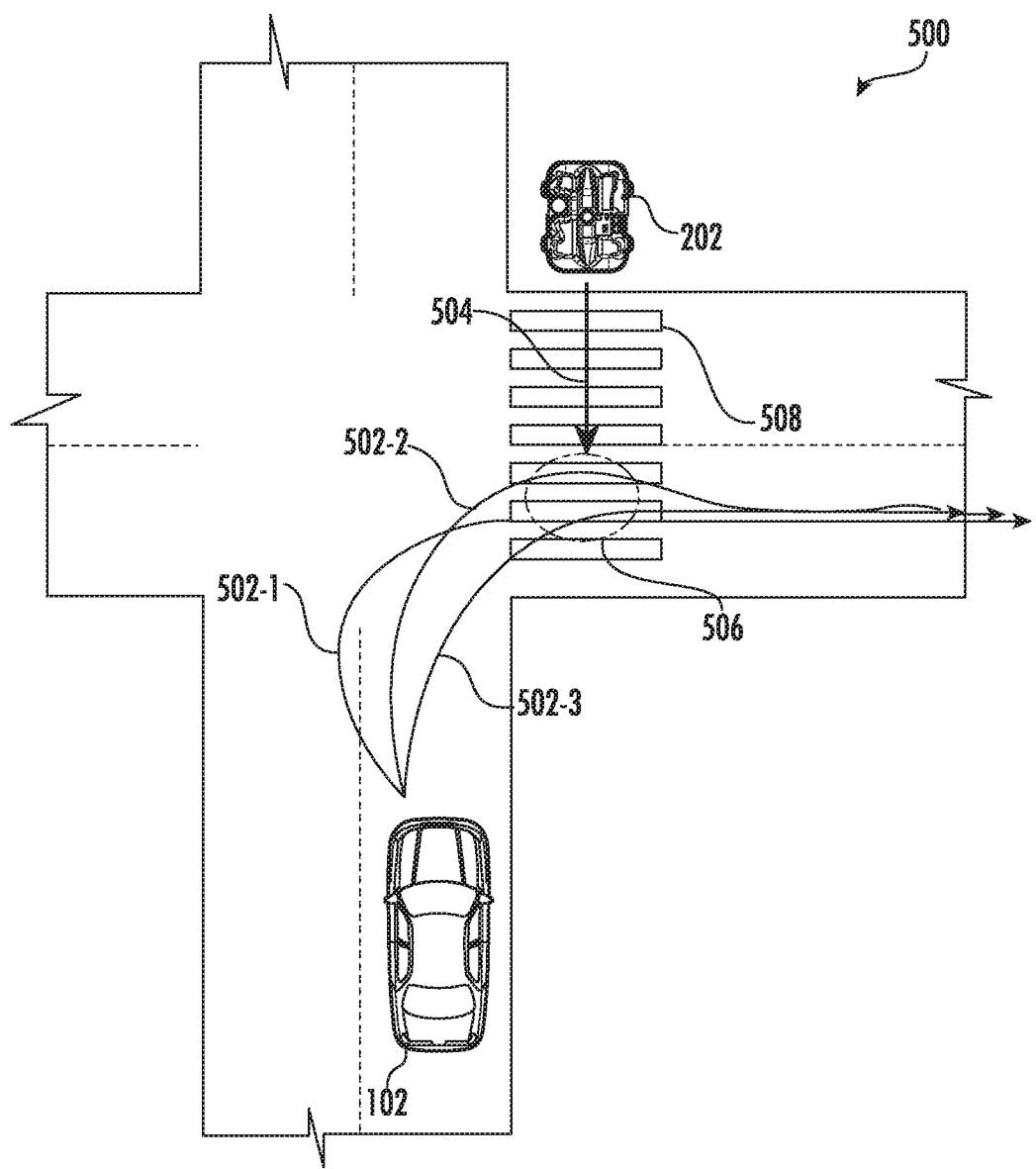
FIG. 5 is a block diagram depicting an example autonomous vehicle interaction with a mobile test device according to example embodiments of the present disclosure.

FIG. 5 is a block diagram depicting an example autonomous vehicle interaction with a mobile test device 202 according to example embodiments of the present disclosure. As an example, a target interaction 500 between an autonomous vehicle 102 executing a right-hand turn at an intersection having a crosswalk that is perpendicular to the direction of traffic into which the autonomous vehicle is making the right turn. In some examples, the autonomous vehicle test system 220 can define a target interaction between the autonomous vehicle 102 and the mobile test device 202 at one or more interaction points 506 corresponding to the crosswalk 508. For example, the autonomous vehicle test system 220 can define a target interaction as an interaction point 506 on or along the crosswalk 508. In order to test the autonomous vehicle 102, the target interaction can be designed such that the mobile test device 202 is to cross a planned path for the autonomous vehicle. The mobile test device 202 can be controlled using the motion planning data so as to force the target interaction between the autonomous vehicle 102 and the mobile test device 202. For example, the target interaction can require the mobile test device to cross one or more planned paths 502-1-502-3 for the autonomous vehicle 102 at or near the interaction point 506. The autonomous vehicle motion planning data can be utilized to control the motion of the mobile test device 202 along a path 504 that will cross with a planned future location of the autonomous vehicle 102 according to its own motion planning data.

In some examples, the autonomous vehicle test system 220 can utilize motion planning data from an autonomous vehicle 102 to update the motion of a mobile test device 202 in order to execute a target interaction. For example, the autonomous vehicle test system 220 can modify the path 504, speed, acceleration, orientation, or other state of the mobile test device 202 in response to motion planning data of the autonomous vehicle 102. For example, if an autonomous vehicle 102 is executing a right-hand turn, the motion plan of the autonomous vehicle 102 may be modified as the autonomous vehicle executes the right-hand turn. For instance, the autonomous vehicle 102 may begin on a first path 502-1 to make the right-hand turn but then adjust its path 502-2-502-3 as it executes the turn. The autonomous vehicle test system 220 can receive the motion planning data indicative of the altered path of the autonomous vehicle prior to the autonomous vehicle executing the altered path. As such, the autonomous vehicle test system 220 can generate updated motion parameters for the mobile test device so that the mobile test device 202 still achieves the target interaction at target interaction point 506 at the crosswalk 508.

A mobile test device 202 may be equipped with a proxy representing a person, bicycle, or other object that is to utilize the crosswalk to cross the street. In other examples, a proxy the not be used.

Figure 6:
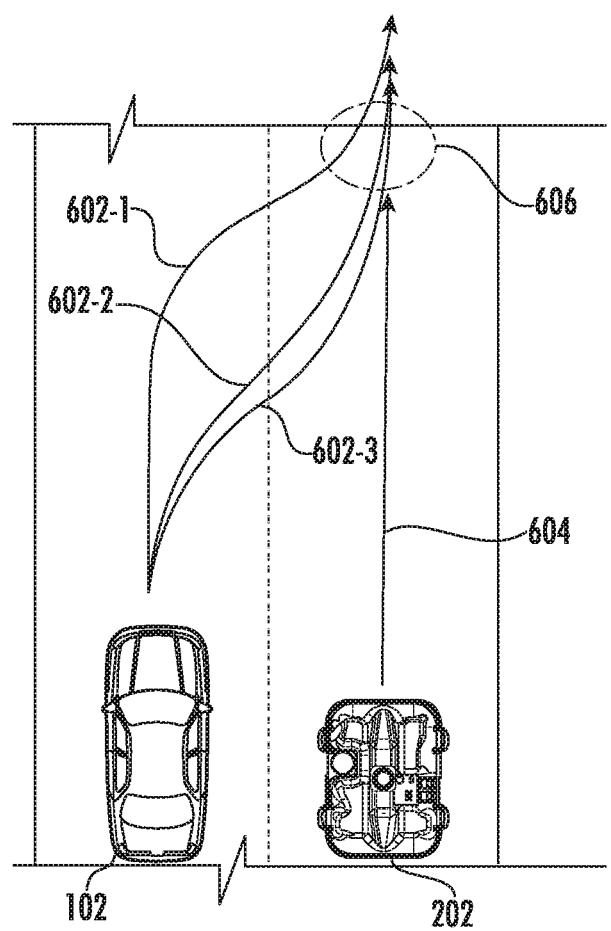
FIG. 6 is a block diagram depicting an example autonomous vehicle interaction with a mobile test device according to example embodiments of the present disclosure.

FIG. 6 is a block diagram depicting an example autonomous vehicle interaction with a mobile test device according to example embodiments of the present disclosure. As an example, a target interaction between an autonomous vehicle 102 and a mobile test device 202 can include an interaction at one or more points along the motion trajectory of the autonomous vehicle 102. In some examples, the autonomous vehicle test system 220 can define a target interaction between the autonomous vehicle 102 and the mobile test device 202 at one or more interaction points corresponding to the autonomous vehicle motion trajectory while changing a lane. For example, the autonomous vehicle test system 220 can define a target interaction as an interaction point 606 on or along the planned paths 602-1-602-3 of the autonomous vehicle 102. In order to test the autonomous vehicle 102, the target interaction can be designed such that the mobile test device 202 is to cross a planned path for the autonomous vehicle. The mobile test device 202 can be controlled using the motion planning data so as to force the target interaction between the autonomous vehicle 102 and the mobile test device 202. For example, the execute the target interaction, the autonomous vehicle test system can send control commands to the mobile test device 202 to cross the one or more planned paths 602-1-602-3 for the autonomous vehicle 102 at or near the interaction point 606. The autonomous vehicle motion planning data can be utilized to control the motion of the mobile test device 202 along a path 604 that will cross with a planned future location of the autonomous vehicle according to its own motion planning data.

In some examples, the autonomous vehicle test system 220 can utilize motion planning data from an autonomous vehicle 102 to update the motion parameters of a mobile test device 202 in order to execute a target interaction. For example, the motion parameters may indicate that the mobile test device 202 should speed up, slow down, turn, etc. in order to arrive at a target interaction point at a target interaction time. For instance, the autonomous vehicle test system 220 can modify the path 604, speed, acceleration, orientation, or other state of the mobile test device in response to motion planning data of the autonomous vehicle. For example, if an autonomous vehicle 102 is changing a lane or is about to change a lane, the motion plan of the autonomous vehicle 102 may be modified as the autonomous vehicle 102 executes the lane change. For instance, the autonomous vehicle 102 may begin on a first path 602-1 to change the lane but then adjust its path 602-2 or 602-3 as it executes the lane change. The autonomous vehicle test system 220 can receive the motion planning data indicative of the altered path of the autonomous vehicle 102 prior to the autonomous vehicle 102 executing the altered path. As such, the test system can generate updated motion parameters for the mobile test device 202 so that the mobile test device still achieves the target interaction at target interaction point 606.

The mobile test device 202 may be equipped with a proxy representing a person, bicycle, or other object that is to utilize the road. In other examples, a proxy the not be used.

Figure 7:
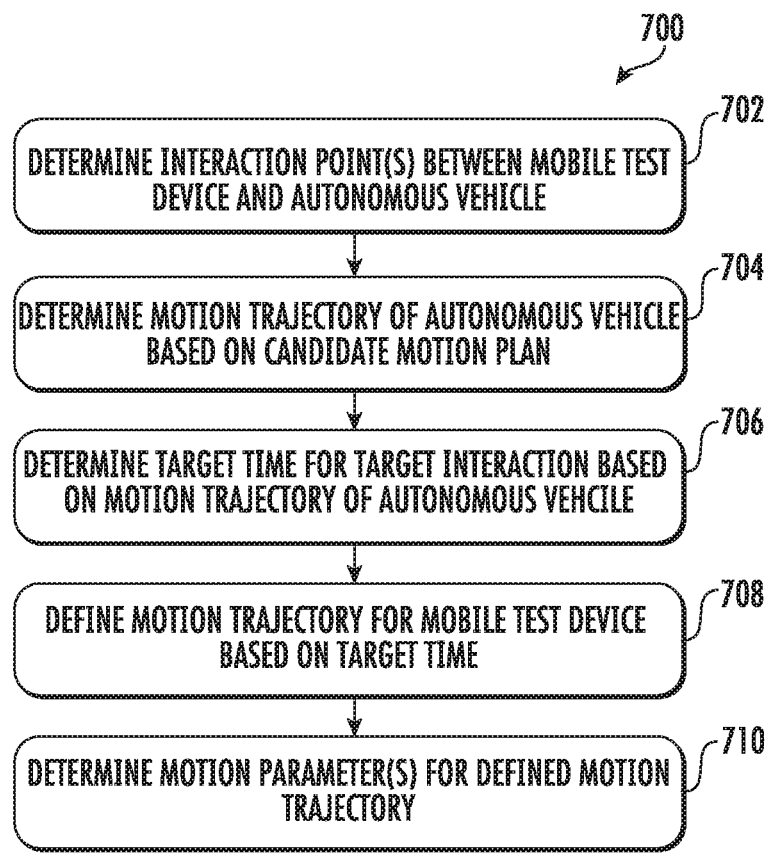
FIG. 7 is a flowchart diagram depicting an example process of generating motion parameters for a mobile test device based on a target interaction with an autonomous vehicle and a motion plan for the autonomous vehicle according to example embodiments of the present disclosure.

FIG. 7 is a flowchart diagram depicting an example method 700 of generating motion parameters for a mobile test device based on a target interaction with an autonomous vehicle and a motion plan for the autonomous vehicle according to example embodiments of the present disclosure. In example embodiments, method 700 may be performed by an autonomous vehicle test system 220, vehicle computing system 112, autonomous vehicle test computing system 1300 and/or machine-learning computing system 1030.

At 702, method 700 includes determining one or more interaction points between a mobile test device and an autonomous vehicle. For example, the autonomous vehicle test system can determine one or more interaction points (e.g., GPS coordinates of geographic locations) for a target interaction between the autonomous vehicle and the mobile test device. In some instances, the interaction point can be defined as part of the target interaction. In other examples, the interaction points can be determined in response to a target interaction. For example, the test system can determine one or more interaction points along an autonomous vehicle path at which a target interaction is to occur. In some examples, the autonomous vehicle test system can determine a target interaction time for the target interaction at the interaction point(s). For example, the autonomous vehicle test system can determine a target time at which mobile test device should be positioned for the target interaction with the autonomous vehicle at the one or more interaction points based on the autonomous vehicle's motion plan.

At 702, the method 700 includes determining a motion trajectory of the autonomous vehicle based on one or more candidate motion plans. In some examples, each candidate motion plan can be associated with a probability or other measure of likelihood that the autonomous vehicle will execute the candidate motion plan. For instance, at a first time in advance of the target interaction, the candidate motion plans may include or otherwise be associated with a first set of probabilities (e.g., 25% each). As the current time becomes closer to the target interaction and the system narrows in on a more likely motion plan, the set of probabilities may be updated (e.g., 10%, 10%, 10%, 70%). Based on the probability or other measure of likelihood of the one or more candidate motion plans, the autonomous vehicle test system can determine a motion trajectory for the autonomous vehicle. For example, the autonomous vehicle test system can determine a motion trajectory for the autonomous vehicle based on the most likely candidate motion plan the autonomous vehicle will execute.

At 706, the method 700 includes determining a target time for the target interaction based on the motion trajectory of the autonomous vehicle. In some examples, the target time can be indicative of the time for the mobile test device to reach the interaction point with the autonomous vehicle. In some examples, the target time can be indicative of the time at which the mobile test device can reach the interaction point to execute a target interaction.

At 708, the method 700 includes determining a motion trajectory for the mobile test device using the interaction points and the target interaction time. For example, the autonomous vehicle test system can determine a route or path for the mobile test device, a speed and/or acceleration for the mobile test device, and/or orientation for the mobile test device to achieve the target interaction based at least in part on the interaction points, the target interaction time, and/or the motion planning data of the autonomous vehicle. In some examples, the autonomous vehicle test system can modify the path, speed, acceleration, orientation, or other state of the mobile test device in response to updates or alterations to the motion planning data of the autonomous vehicle.

At 710, the method 700 includes, determining one or more motion parameters for the mobile test device. In some examples, the one or more motion parameters for the mobile test device are based at least in part on the motion trajectory for the mobile test device. In some examples, the one or more motion parameters for the mobile test device can be based at least in part on the motion planning data and the data indicative of the target interaction. In some examples, the one or more motion parameters for the mobile test device can be based at least in part on the target time to reach the interaction point with the autonomous vehicle. For instance, determining a motion trajectory for the mobile test device can comprise determining one or more first motion parameters for the mobile test device to reach an interaction point with the autonomous vehicle at a target time can be based at least in part on the first motion plan or first motion trajectory of the autonomous vehicle, wherein the one or more first motion parameters can be determined prior to the autonomous vehicle executing the first motion plan, and determining one or more second motion parameters for the mobile test device to reach the interaction point with the autonomous vehicle at a target time can be based at least in part on the second motion plan or second motion trajectory of the autonomous vehicle, wherein the one or more second motion parameters can be determined prior to the autonomous vehicle executing the second motion plan.

The autonomous vehicle test system can validate one or more portions of an autonomous vehicle by analyzing motion planning data that is generated in response to target interactions. More particularly, the autonomous vehicle test system can analyze predictive data generated by the autonomous vehicle in response to a target interaction to validate the autonomous vehicle's reaction to the target interaction. In this manner, the test system can validate predictive motion plans generated by the autonomous vehicle, in addition to or in place of the validation of actual movements or motions of the autonomous vehicle itself. By way of example, the test system can analyze motion planning data generated in response to a mobile test device crossing a pathway that the autonomous vehicle is to cross. In some examples, the mobile test device can collect data such as GPS points and/or timestamps that can be used to determine the ground truth of an actor, perform cross track validation, perform long track validation, and/or perform velocity validation. The test system can validate predictive motion plans generated by the autonomous vehicle, based on the motions of the autonomous vehicle itself and/or the data from the mobile test device.

Figure 8:
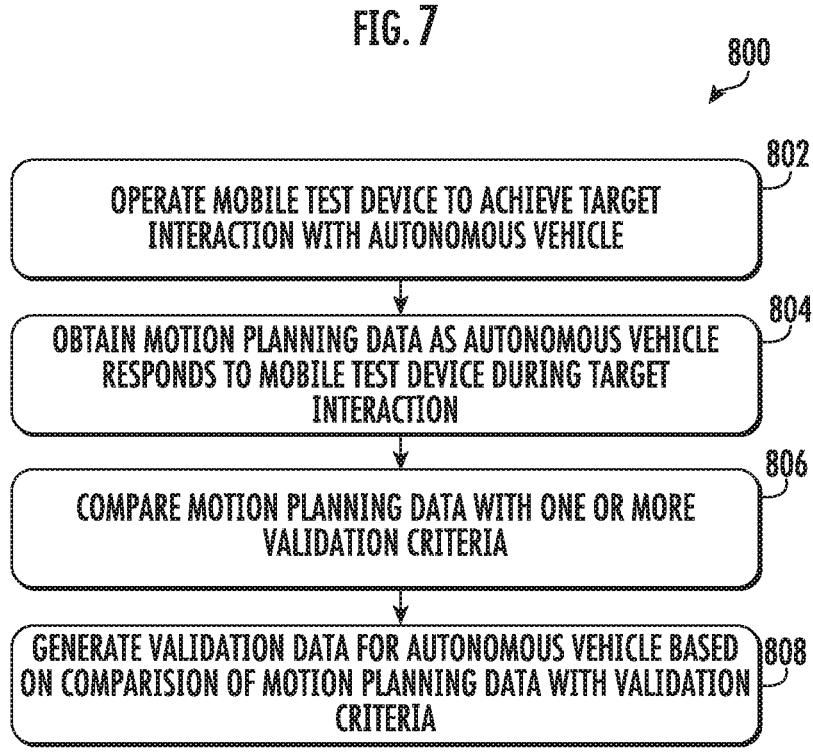
FIG. 8 is a flowchart diagram depicting an example process of validating at least a portion of an autonomous vehicle based on motion planning data generated during a target interaction with a mobile test device according to example embodiments of the present disclosure.

FIG. 8 is a flowchart diagram depicting an example process of validating at least a portion of an autonomous vehicle based on motion planning data generated during a target interaction with a mobile test device according to example embodiments of the present disclosure.

At 802, method 800 includes operating the mobile test device to achieve a target interaction with the autonomous vehicle. In some examples, the autonomous vehicle test system can operate the mobile test device. For instance, the autonomous vehicle test system can transmit one or more control commands to the mobile test device to operate the mobile test device to achieve the target interaction with the autonomous, such as where the autonomous vehicle test system is remote from the mobile test device. In other examples, the autonomous vehicle test system can issue control commands to operate the mobile test device directly to the mobile test device to achieve the target interaction with the autonomous, such as where the autonomous vehicle test system is at least partially included within the mobile test device. The mobile test device can provide control signals to control various systems of the mobile test device to achieve the target interaction with the autonomous based on the control commands. For example, the mobile test device can provide one or more control signals to a device propulsion system of the vehicle test device based on the control commands.

At 804, method 800 includes obtaining motion planning data as the autonomous vehicle responds to the mobile test device during the target interaction. For example, the autonomous vehicle test system can obtain and/or analyze the data indicative of the motion plan for the autonomous vehicle in response to a target interaction. For instance, the autonomous vehicle test system can obtain and/or analyze motion planning data generated in response to a mobile test device crossing a pathway that the autonomous vehicle is to cross.

At 806, method 800 includes comparing the motion planning data generated by the autonomous vehicle in response to the target interaction with one or more validation criteria to validate the autonomous vehicle's reaction to the target interaction. The autonomous vehicle motion planning data can be used to validate the reaction of an autonomous vehicle to a target interaction. For example, autonomous vehicle test system can be configured to analyze predictive data generated by the autonomous vehicle in response to a target interaction to validate the autonomous vehicle's reaction to the target interaction.

At 808, method 800 includes generating validation data for the autonomous vehicle based at least in part on the comparison between the motion planning data generated by the autonomous vehicle in response to the target interaction with one or more validation criteria. In some examples, the autonomous vehicle test system can utilize one or more threshold criteria to validate predictive motion plans generated by an autonomous vehicle. For example, if a motion plan generated in response to the target interaction satisfies the threshold criteria for the one or more operations of the autonomous vehicle, the autonomous vehicle test system can generate validation data that validates the predictive motion plan for the autonomous vehicle in response to a target interaction. For example, if a motion plan generated in response to the target interaction does not satisfy the threshold criteria for the one or more operations of the autonomous vehicle, the autonomous vehicle test system can generate validation data that does not validate the predictive motion plan for the autonomous vehicle in response to a target interaction.

In some examples, the autonomous vehicle test system can utilize one or more threshold criteria to validate the actual movements and/or the operations of the autonomous vehicle generated in response to executing the target interactions. Motion planning data, for example, can be analyzed to determine the manner in which an autonomous vehicle plans a response to a target interaction with a mobile test device.

Figure 9:
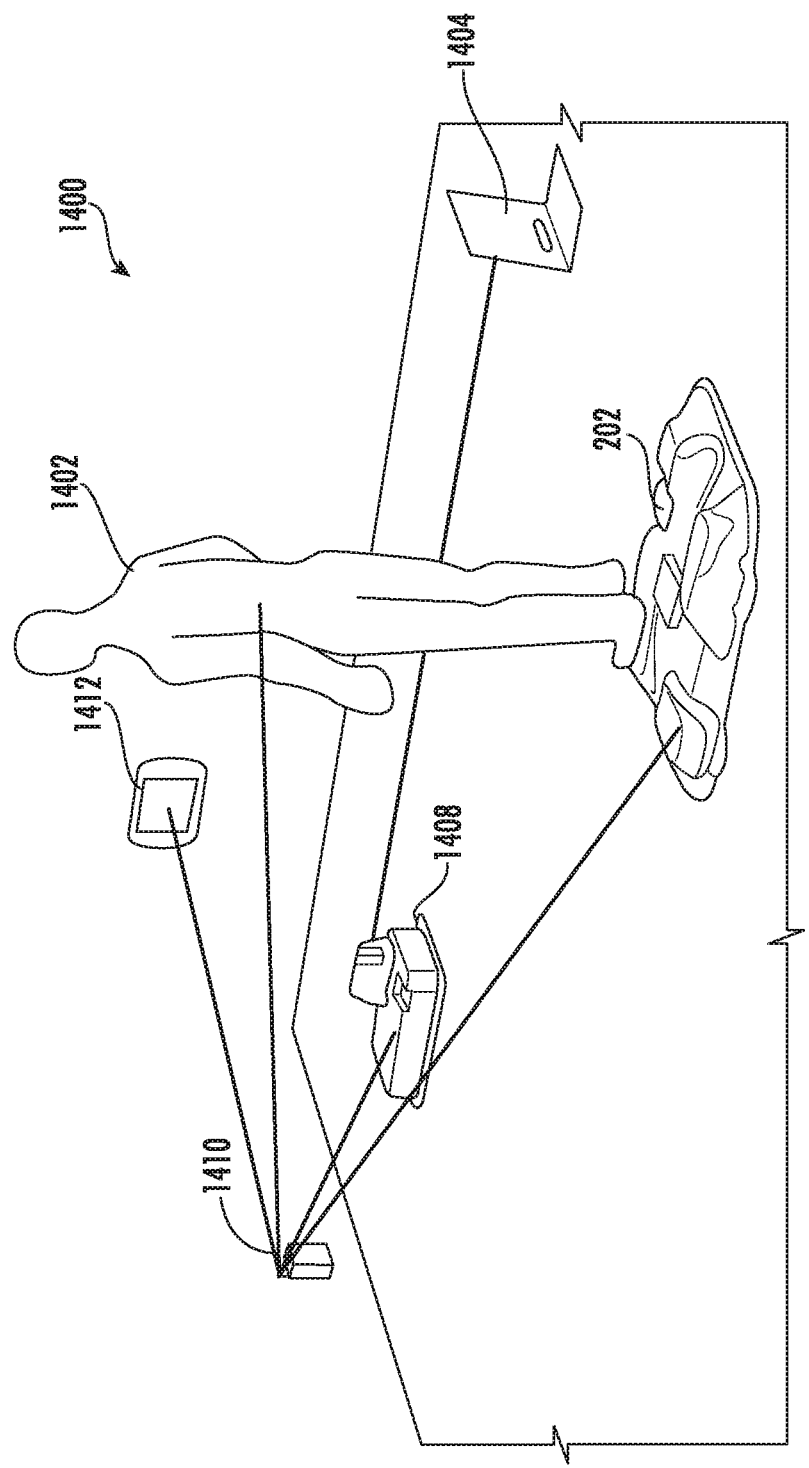
FIG. 9 depicts an example system overview including a mobile test device according to example embodiments of the present disclosure.
Figure 10:
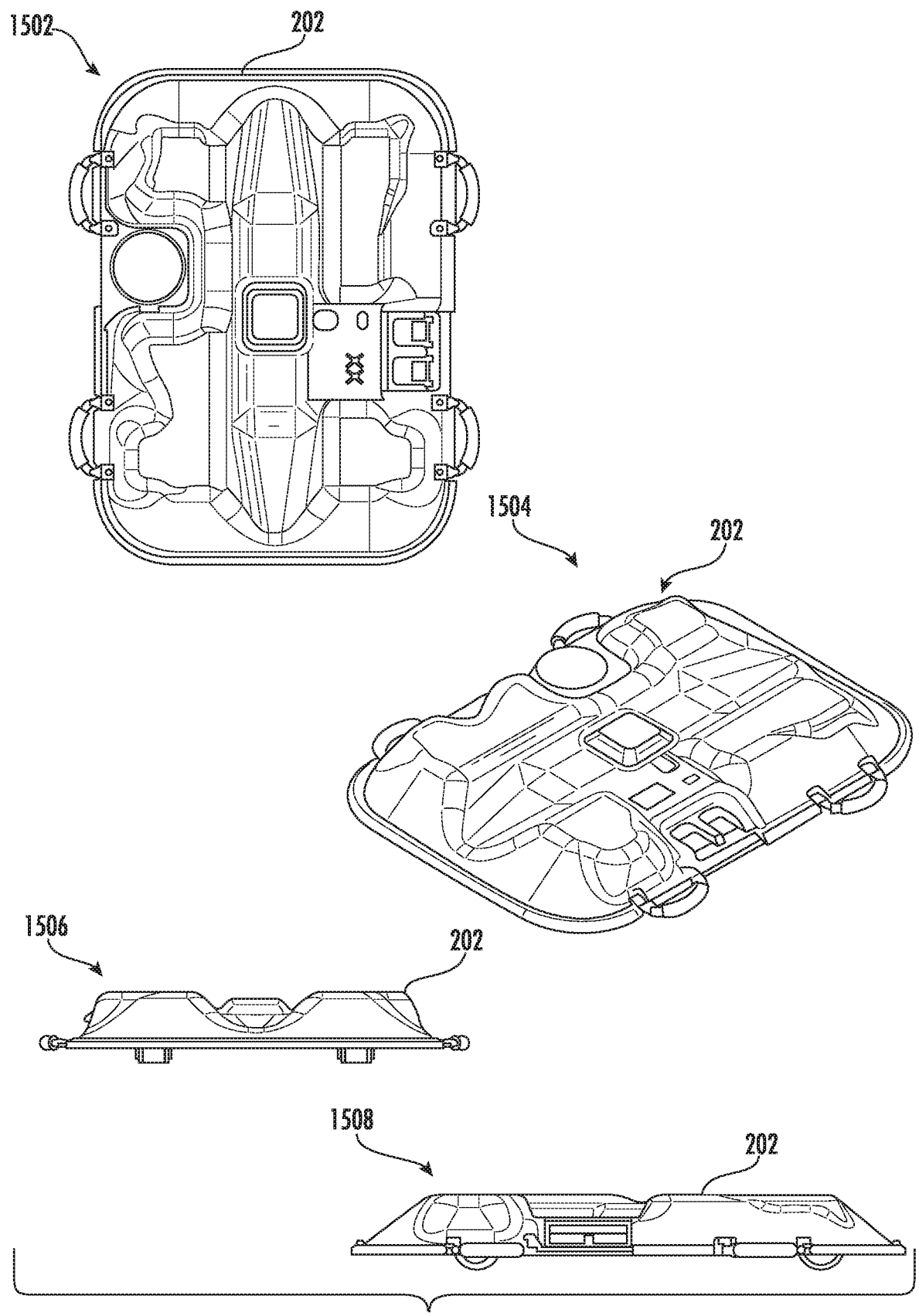
FIG. 10 depicts various views of an example mobile test device according to example embodiments of the present disclosure.

FIG. 9 depicts an example system overview including a mobile test device according to example embodiments of the present disclosure. FIG. 10 depicts various views of an example mobile test device 202 according to example embodiments of the present disclosure. A top view of the mobile test device 202 is depicted at 1502, a a perspective view of the mobile test device 202 is depicted at 1504, a front view of the mobile test device 202 is depicted at 1506, and a side view of the mobile test device 202 is depicted at 1508. The mobile test device 202 can inlcude a chassis that at least artially or completely covers a plurality of electronics that are used to control various systems such as a drive propulsion system, etc. of the mobile test device.

Figure 11:
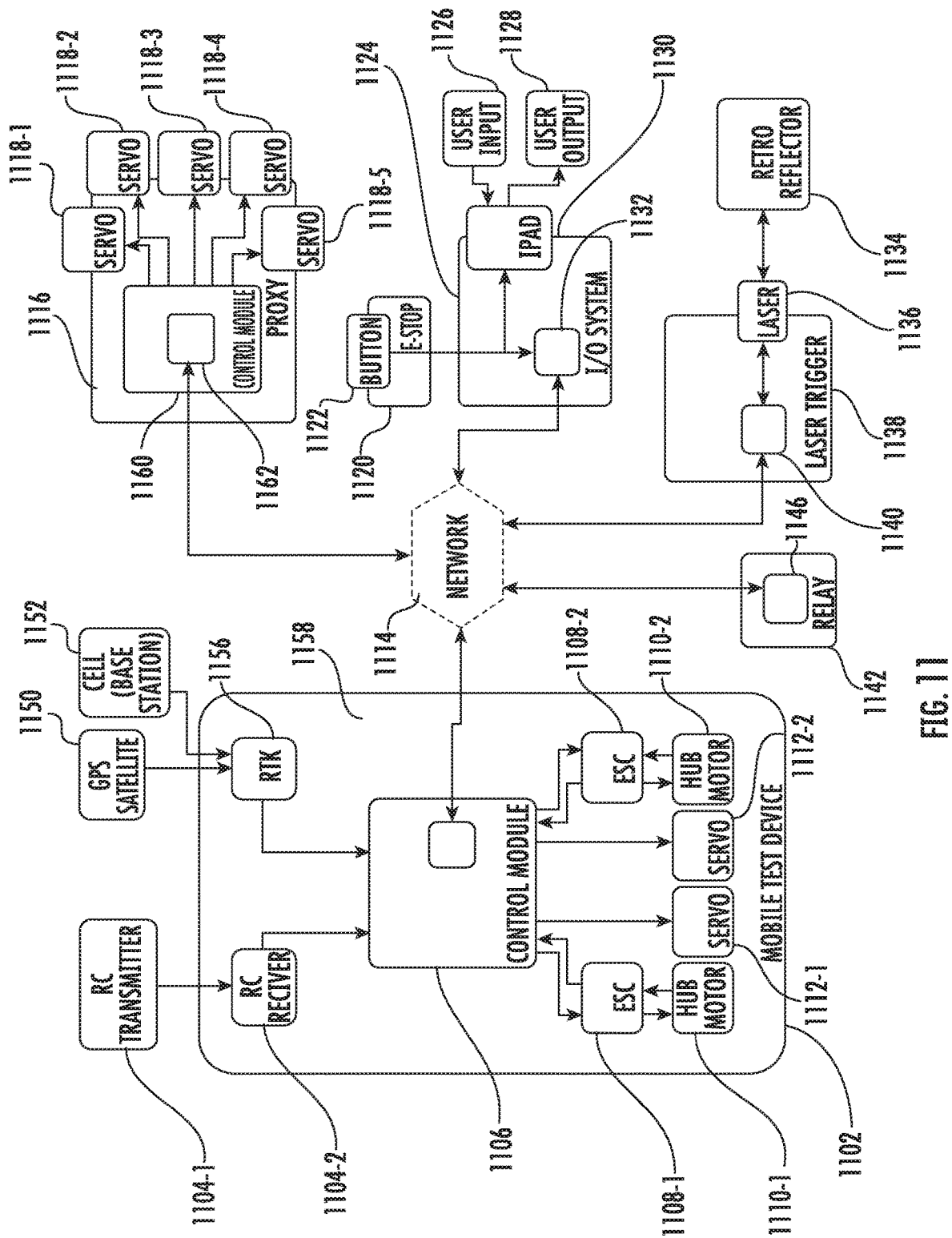
FIG. 11 is a block diagram depicting an example system including a mobile test device according to example embodiments of the present disclosure.

With reference to FIG. 9, an example ystem 1400 can include a mobile test device 202 in accordance with example embodiments. In some examples, the mobile test device 202 can be implemented as a robotic mobile platform that can be controlled using manual radio communication, GPS guidance, and/or by recording movements of the mobile test device 202 and playing back those movements at a future time. In some examples, a mobile test device 202 may be referred to as a test roamer device. The mobile test device 202 can transport one or more proxies 1402 which can include representations of real-world actors that can interact with machine learned classification models of a perception system of an autonomous vehicle, for example. By way of example, the mobile test device 202 can transport proxies such as representations of pedestrians, bicycles, bicycle riders, bicycle walkers, animals, or any other object. The mobile test device 202 can collect data such as GPS points and/or timestamps that can be used to determine the ground truth of an actor, perform cross track validation, perform long track validation, and/or perform velocity validation. In some examples, the system 1400 can include multiple distributed components such as laser emitters or triggers 1408, reflectors 1404, relays 1410, an input/output system 1412, and/or other components to accurately determine the position of the mobile test device 202 and to accurately control its position with an environment. Numerous types of systems may be utilized to control the mobile test device. FIG. 11 is a block diagram depicting an example system including a mobile test device 202 according to example embodiments of the present disclosure. In example embodiments, a mobile test device 1102 can include one or more communication interfaces such as a radio communications transmitter 1104-1, radio communication receiver 1104-2, cellular transceiver 1152, and/or global positioning system (GPS) transceiver 1150. A mobile test device 1102 or test roamer device can include a drive propulsion system including one or more hub motors 1110-1 or 1110-2 in order to move the test roamer device within an environment. The drive propulsion system can include one or more wheels or other locomotive components which are driven by one or more motors in example embodiments. In some instances, a mobile test device 1102 can include a plurality of wheels which are independently controlled using servomotors 1112-1-1112-2. The mobile test device 1102 can include a controller such as a control module 1106 implemented using one or more computing devices on the mobile test device 1102. The computing device(s) can include a general processor or application-specific circuit in example embodiments. The mobile test device 1102 can communicate with the autonomous vehicle test system 220 and/or autonomous vehicle 102 over one or more networks 1114 such as mesh networks, Wi-Fi networks, cellular networks, Bluetooth networks, and the like. In some examples, the mobile test device 1102 can include a controller such as a control module 1106 implemented using one or more processors or application-specific integrated circuits.

In some examples, a mobile test device 1102 can include a chassis 1158 that at least partially encloses a plurality of electronics that are used to control the mobile test device 1102. The mobile test device 1102 can include a power distribution component configured to provide power to the various electronics onboard the mobile test device 1102. In some examples, the power distribution component can be included in the control module 1106, the electronic speed control module 1108-1 or 1108-2, or the hub motors 1110-1 or 1110-2. One or more electronic speed control modules 1108-1 or 1108-2 can be included in example embodiments. A real-time kinematic positioning system 1156 can be utilized to enhance positioning data received from a global positioning system. One or more transceiver modules (e.g., 1104-1, 1104-2, 1150, and 1152) can be included within the mobile test device 1102.

In some examples, the system 1100 can include a proxy 1116 coupled with the mobile test device 1102. The proxy 1116 can be configured to represent a person, bicycle, or other object that is to utilize the crosswalk to cross the street. In other examples, a proxy the not be used. The mobile test device 1102 can be configured to transport one or more proxies 1116 which can include representations of real-world actors that can interact with machine learned classification models of a perception system 124 of an autonomous vehicle, for example. In some examples, the proxy 1116 can be configured to include a control module 1160 implemented using one or more computing devices, processors, or application-specific integrated circuits. In some examples, the proxy 1116 can be configured to include one or more servomotors 1118-1-1118-4.

In some examples, the mobile test device 1102 can include an input/output system 1124 communicatively coupled with the mobile test device 1102. The input/output system 1124 can include one or more computing devices, one or more processors, and/or one or more displays. In some instances, the input output system can include a radio control device such as a controller, joystick or other input device can be used to manually control a mobile test device.

The input/output system 1124 can be configured to receive input from a user to facilitate generating data indicative of target interaction and/or receive and display outputs from the autonomous vehicle test system. In some embodiments, the input/output system 1124 can receive data indicative of a target interaction from one or more users, such as one or more operators associated with the autonomous vehicle test system. For instance, an operator may provide one or more inputs to the input/output system 1124 as part of a process to define a target interaction and generate data indicative of such interaction. In some examples, a user may provide one or more inputs to the input/output system 1124 to define a target interaction including a geographic location, velocity, or other state information associated with the mobile test device 202, path information, motion trajectory information etc. In some examples, a user can provide one or more inputs to set a velocity, acceleration, to trigger a delay, to trigger a proxy movement, etc using the input/output device 1124. In some examples, a target interaction can be predefined or at least partially predefined. An operator or user can provide an input to select a predefined interaction and then optionally modify the target interaction using the input/output system 1124. In some examples, the input/output system 1124 can be configured to display data received from the autonomous vehicle test system. In some examples, the input/output system 1124 can be configured to display one or more measured parameters and/or sensor data. For example, the input/output system 1124 can be configured to display data indicative of the target interaction, the target time, and/or the target velocity. In some examples, the input/output system 1124 can be configured to display validation criteria and/or validation data indicative of the validity of the reaction of an autonomous vehicle to a target interaction.

In some examples, the system 1100 can to include distributed components such as laser emitters or triggers 1138, reflectors 1134, relays 1142, and/or other components to accurately determine the position of the mobile test device 1102 and to accurately control its position with an environment.

Figure 12:
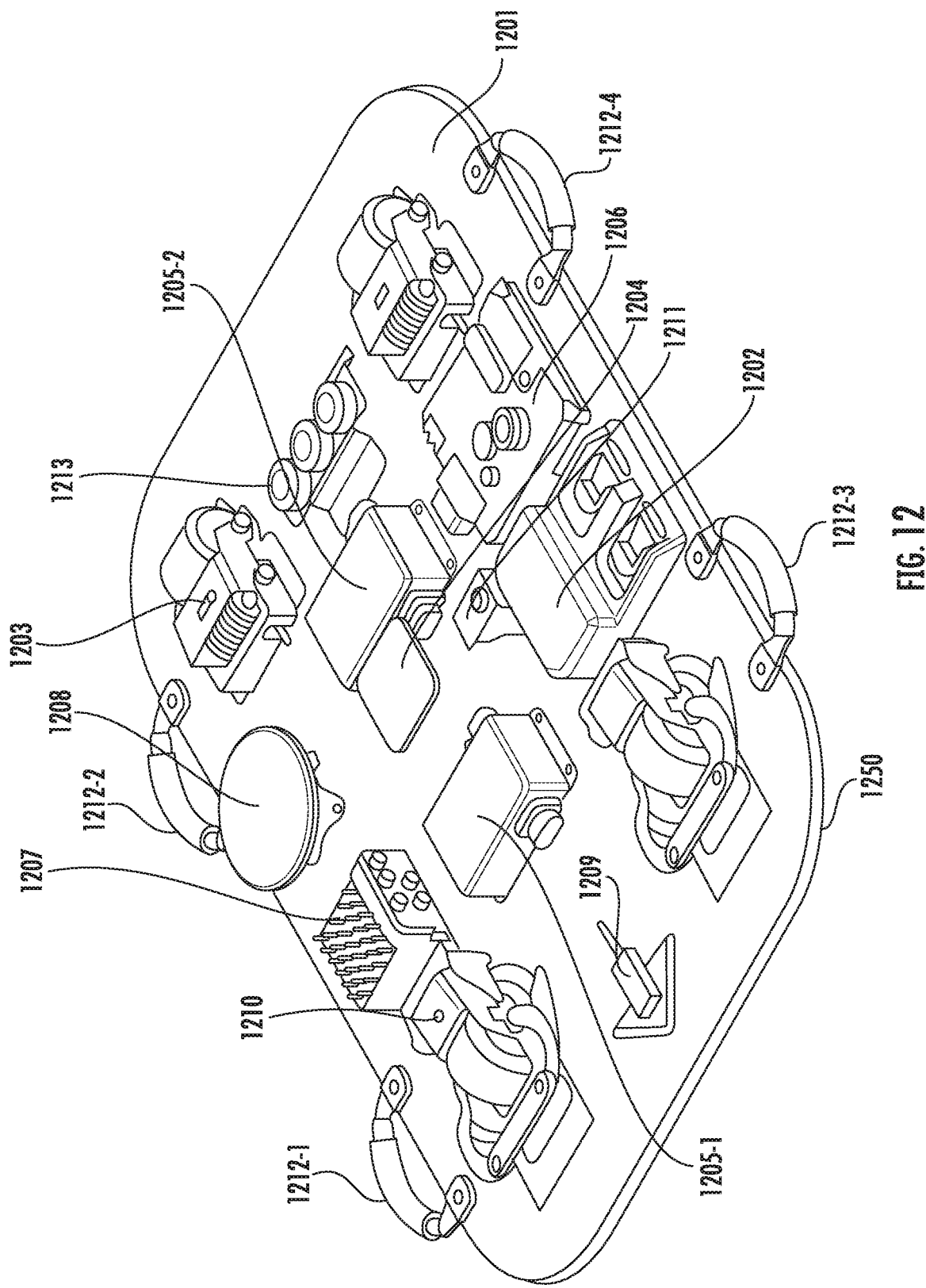
FIG. 12 is a cutaway view of an example mobile test device according to example embodiments of the present disclosure.

FIG. 12 is a cutaway view of an example mobile test device 1250 according to example embodiments of the present disclosure. In some examples, a mobile test device 1250 can include a chassis 1201 that at least partially encloses a plurality of electronics that are used to control the mobile test device 1250. The mobile test device 1250 can include a power distribution component 1202 configured to provide power to the various electronics onboard the mobile test device 1250. The mobile test device 1250 can include one or more drive wheels 1203 configured to cause movement of the mobile test device 1250 relative to a surface. One or more steering modules 1210 may be provided on the mobile test device 1250 to control the direction of travel. The mobile test device 1250 can include a cover or other interface 1204 for coupling with a proxy. One or more electronic speed control modules 1205 can be included in example embodiments. The mobile test device 1250 can include a controller such as a control module 1206 implemented using one or more processors or application-specific integrated circuits. A real-time kinematic positioning system 1207 can be utilized to enhance positioning data received from a global positioning system. The communication interfaces can include a global positioning system antenna 1208, in example embodiments. The communication interfaces can also include one or more antennae 1213 for transmitting and receiving signals from one or more distributed components such as laser emitters, reflectors, relays, and/or other components to accurately determine the position of the mobile test device 1250 and to accurately control its position with an environment. One or more transceiver modules 1209 can be included within the mobile test device 1250. In some examples, a disable control switch 1211 can be provided. In some examples, one or more handles 1212-1-1212-4 can be provided to physically interact with or manually move the mobile test device.

Figure 13:
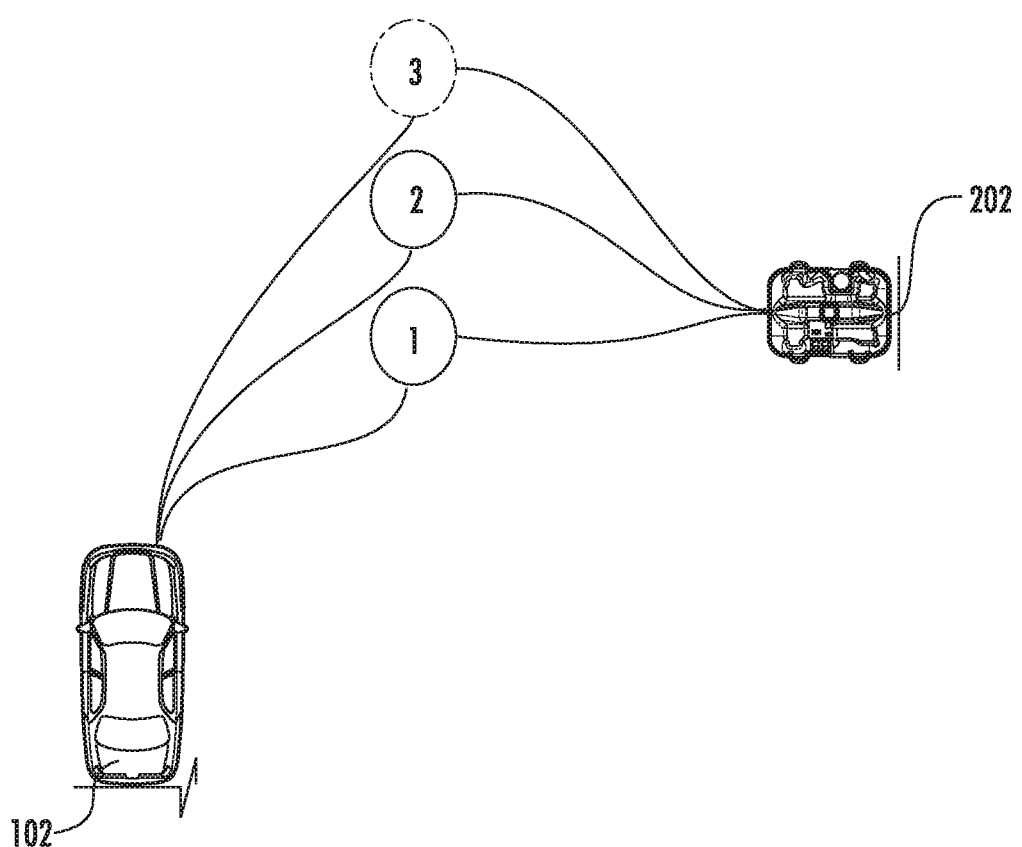
FIG. 13 is a block diagram depicting an example autonomous vehicle interaction with a mobile test device according to example embodiments of the present disclosure.

FIG. 13 is a block diagram depicting an example autonomous vehicle interaction with a mobile test device according to example embodiments of the present disclosure. As an example, a target interaction between an autonomous vehicle 102 and a mobile test device 202 can be defined in terms of circumstance rather than positional coordinate(s). Using the AV motion planning information, the system can alter the target interaction point based on the circumstance. For example, three target interaction points may be sequentially determined as part of altering the targeting point based on the circumstance as illustrated in FIG. 13.

Figure 14:
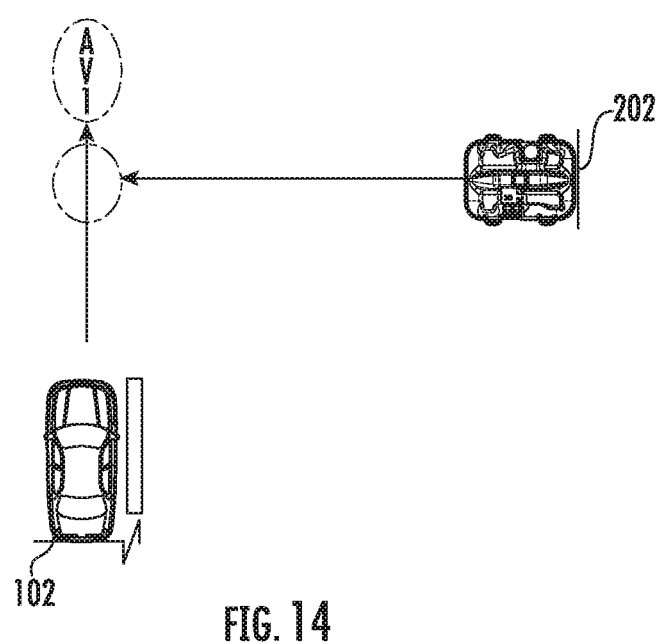
FIG. 14 is a block diagram depicting an example autonomous vehicle interaction with a mobile test device according to example embodiments of the present disclosure.

FIG. 14 is a block diagram depicting an example autonomous vehicle interaction with a mobile test device according to example embodiments of the present disclosure. As an example, a target interaction between an autonomous vehicle 102 and a mobile test device 202 can be defined in terms of relative interactions rather than physical interactions. The system can force relative interactions such as pass at a set distance (e.g., 1 m) behen the AV 102, or cross in front of the AV in a location such that the AV would strike the AV in the future (e.g., in 3 seconds).

Figure 15:
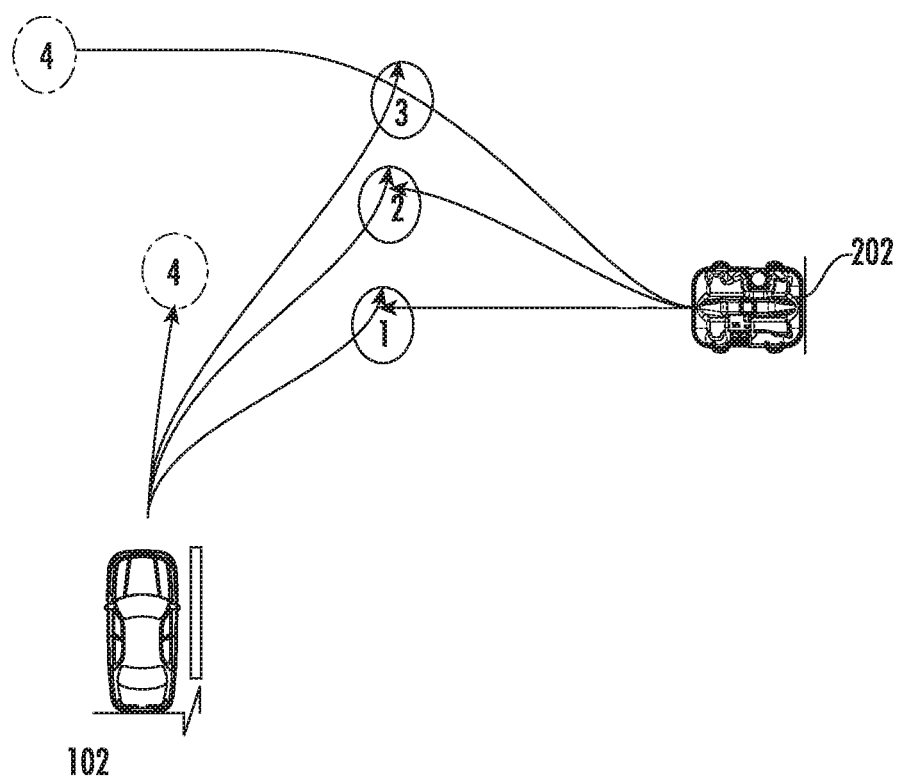
FIG. 15 is a block diagram depicting an example autonomous vehicle interaction with a mobile test device according to example embodiments of the present disclosure.

FIG. 15 is a block diagram depicting an example autonomous vehicle interaction with a mobile test device according to example embodiments of the present disclosure. As an example, a target interaction between an autonomous vehicle 102 and a mobile test device 202 may not be forced in some situations. For example, the AV may continue to update its motion plan to avoid the mobile test device. Accordingly, the system can establish certain criteria upon which the mobile test device can continue to a desired end location such that the AV can continue on its path. Target criteria can include, but are not limited to, AV stops motion, target circumstance is not achieved within a timeframe or number of testing attempts, etc. In the example of FIG. 15, the mobile testing device may attempt interactions at interaction points 1, 2, and 3 based on updated motion planning information for the AV. Finally, the mobile test device may move to test device position 4 so that the AV can continue on its path to AV position 4.

Figure 16:
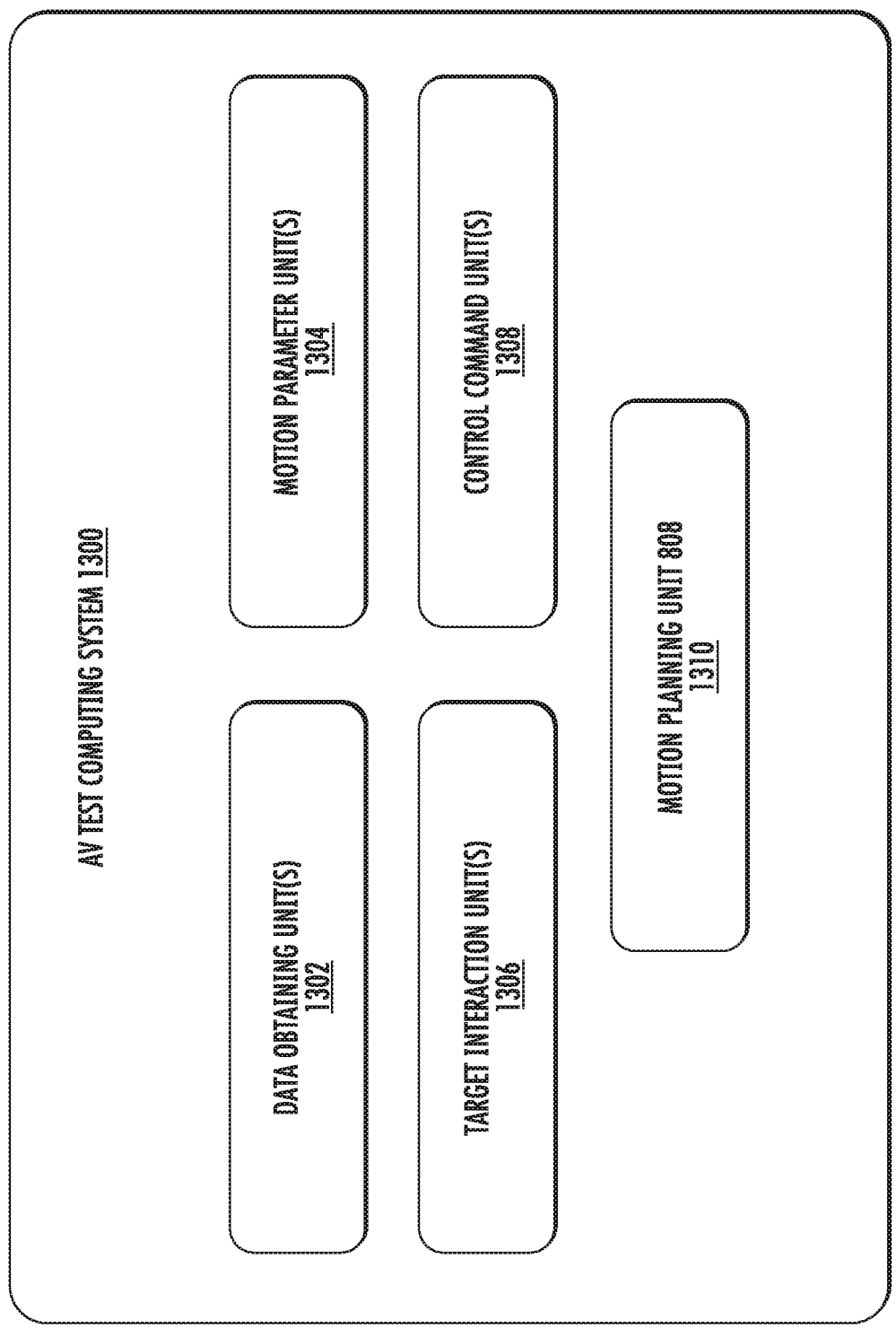
FIG. 16 depicts example system units for performing operations and functions according to example embodiments of the present disclosure.

Various means can be configured to perform the methods and processes described herein. For example, FIG. 16 depicts example system units for performing operations and functions that includes various means according to example embodiments of the present disclosure. For example, the AV test system 1300 can include data obtaining unit(s) 1302, motion parameter unit(s) 1304, target interaction unit(s) 1306, control command unit(s) 1308, motion planning unit(s) 1310 and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., method 400, method 700, and method 800) and/or other operations described herein can be implemented as such algorithm(s). For instance, the means (e.g., data obtaining unit(s) 1302) can be configured to obtain data associated with the autonomous vehicle and/or the mobile testing device. In some examples, the means can be configured to obtain motion planning data generated by an autonomy computing system of an autonomous vehicle. In some examples, the means can be configured to transmit one or more control commands to the mobile test device. The data obtaining unit 1302 is an example of a means for obtaining or transmitting such data as described herein.

The means (e.g., motion parameter unit(s) 1304) can be configured to generate motion parameters associated with a mobile test device. The means can be configured to generate one or more motion parameters in response to motion planning data associated with the autonomous vehicle. The means can be configured to update motion parameters in response to motion planning data associated with the autonomous vehicle. A motion parameter unit 1304 is an example of a means for generating such data, as describes herein.

The means (e.g., target interaction unit(s) 1306) can be configured to generate data indicative of target interaction(s) between an autonomous vehicle and a mobile test device. The means can be configured to determine one or more interaction points, a target interaction time, or a target interaction velocity as a part of the target interaction based at least in part on the motion planning data associated with the autonomous vehicle. A target interaction unit 1306 is one example of a means to generate data indicative of target interactions, as described herein.

The means (e.g., control command unit(s) 1308) can be configured to generate control commands to control devices of a mobile test device based on the motion parameters associated with the mobile test device. For example, the means can be configured to generate control commands to increase the speed of the mobile test device based in part on updated motion parameters that are determined in response to the motion planning data associated with an autonomous vehicle. A control command unit 1308 is one example of a means to generate control commands and control signals, as described herein.

The means (e.g., motion planning unit(s) 1310) can be configured to generate motion plans associated with an autonomous vehicle. The means can be configured to generate one or more motion plans, including one or more candidate motion plans that the autonomous vehicle may execute in the future. A motion planning unit 1310 is an example of a means for generating such data as describes herein.

Figure 17:
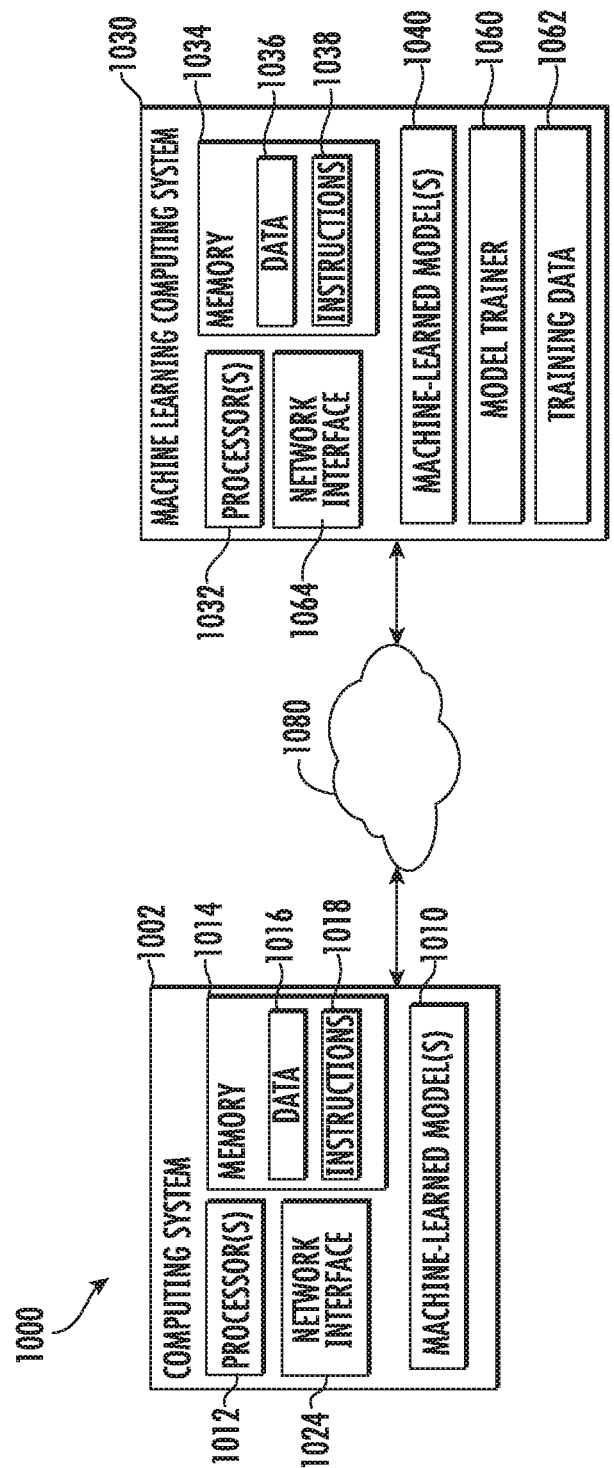
FIG. 17 is a block diagram of an example computing system according to example embodiments of the present disclosure.

FIG. 17 depicts a block diagram of an example computing system 1000 according to example embodiments of the present disclosure. The example computing system 1000 includes a computing system 1002 and a machine learning computing system 1030 that are communicatively coupled over a network 1080.

In some implementations, the computing system 1002 can perform various operations as part of motion planning for an autonomous vehicle. For example, computing system 1002 can receive sensor data map data associated with an environment external to an autonomous vehicle and process the sensor data and the map data to generate a target trajectory for the autonomous vehicle, as part of autonomous vehicle operations. In some implementations, the computing system 1002 can be included in an autonomous vehicle. For example, the computing system 1002 can be on-board the autonomous vehicle. In some embodiments, computing system 1002 can be used to implement vehicle computing system 110. In other implementations, the computing system 1002 is not located on-board the autonomous vehicle. For example, the computing system 1002 can operate offline to obtain sensor data and perform target trajectory generation. The computing system 1002 can include one or more distinct physical computing devices.

The computing system 1002 includes one or more processors 1012 and a memory 1014. The one or more processors 1012 can be any suitable processing device (e.g., a processor core, a microprocessor, an ASIC, a FPGA, a controller, a microcontroller, etc.) and can be one processor or a plurality of processors that are operatively connected. The memory 1014 can include one or more non-transitory computer-readable storage media, such as RAM, ROM, EEPROM, EPROM, one or more memory devices, flash memory devices, etc., and combinations thereof.

The memory 1014 can store information that can be accessed by the one or more processors 1012. For instance, the memory 1014 (e.g., one or more non-transitory computer-readable storage mediums, memory devices) can store data 1016 that can be obtained, received, accessed, written, manipulated, created, and/or stored. The data 1016 can include, for instance, map data, image or other sensor data captured by one or more sensors, machine-learned models, etc. as described herein. In some implementations, the computing system 1002 can obtain data from one or more memory device(s) that are remote from the computing system 1002.

The memory 1014 can also store computer-readable instructions 1018 that can be executed by the one or more processors 1012. The instructions 1018 can be software written in any suitable programming language or can be implemented in hardware. Additionally, or alternatively, the instructions 1018 can be executed in logically and/or virtually separate threads on processor(s) 1012.

For example, the memory 1014 can store instructions 1018 that when executed by the one or more processors 1012 cause the one or more processors 1012 to perform any of the operations and/or functions described herein, including, for example, generating motion plans for autonomous vehicles, target trajectories for a mobile test device, etc.

According to an aspect of the present disclosure, the computing system 1002 can store or include one or more machine-learned models 1010. As examples, the machine-learned models 1010 can be or can otherwise include various machine-learned models such as, for example, neural networks (e.g., deep neural networks or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1002 can receive the one or more machine-learned models 1010 from the machine learning computing system 1030 over network 1080 and can store the one or more machine-learned models 1010 in the memory 1014. The computing system 1002 can then use or otherwise implement the one or more machine-learned models 1010 (e.g., by processor(s) 1012). In particular, the computing system 1002 can implement the machine-learned model(s) 1010 to generate uncertainty data for object detections, predictions, and motion plan generation based on sensor data.

The machine learning computing system 1030 includes one or more processors 1032 and a memory 1034. The one or more processors 1032 can be any suitable processing device (e.g., a processor core, a microprocessor, an ASIC, a FPGA, a controller, a microcontroller, etc.) and can be one processor or a plurality of processors that are operatively connected. The memory 1034 can include one or more non-transitory computer-readable storage media, such as RAM, ROM, EEPROM, EPROM, one or more memory devices, flash memory devices, etc., and combinations thereof. In some embodiments, machine learning computing system 1030 can be used to implement vehicle computing system 110.

The memory 1034 can store information that can be accessed by the one or more processors 1032. For instance, the memory 1034 (e.g., one or more non-transitory computer-readable storage mediums, memory devices) can store data 1036 that can be obtained, received, accessed, written, manipulated, created, and/or stored. The data 1036 can include, for instance, machine-learned models, sensor data, and map data as described herein. In some implementations, the machine learning computing system 1030 can obtain data from one or more memory device(s) that are remote from the machine learning computing system 1030.

The memory 1034 can also store computer-readable instructions 1038 that can be executed by the one or more processors 1032. The instructions 1038 can be software written in any suitable programming language or can be implemented in hardware. Additionally, or alternatively, the instructions 1038 can be executed in logically and/or virtually separate threads on processor(s) 1032.

For example, the memory 1034 can store instructions 1038 that when executed by the one or more processors 1032 cause the one or more processors 1032 to perform any of the operations and/or functions described herein, including, for example, generating motion plans including target trajectories for an autonomous vehicle, and controlling an autonomous vehicle based on the target trajectories.

In some implementations, the machine learning computing system 1030 includes one or more server computing devices. If the machine learning computing system 1030 includes multiple server computing devices, such server computing devices can operate according to various computing architectures, including, for example, sequential computing architectures, parallel computing architectures, or some combination thereof.

In addition or alternatively to the machine-learned model(s) 1010 at the computing system 1002, the machine learning computing system 1030 can include one or more machine-learned models 1040. As examples, the machine-learned models 1040 can be or can otherwise include various machine-learned models such as, for example, neural networks (e.g., deep neural networks) or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1030 can communicate with the computing system 1002 according to a client-server relationship. For example, the machine learning computing system 1030 can implement the machine-learned models 1040 to provide a web service to the computing system 1002. For example, the web service can generate motion plans including target trajectories in response to sensor data and/or other data received from an autonomous vehicle.

Thus, machine-learned models 1010 can located and used at the computing system 1002 and/or machine-learned models 1040 can be located and used at the machine learning computing system 1030.

In some implementations, the machine learning computing system 1030 and/or the computing system 1002 can train the machine-learned models 1010 and/or 1040 through use of a model trainer 1060. The model trainer 1060 can train the machine-learned models 1010 and/or 1040 using one or more training or learning algorithms. One example training technique is backwards propagation of errors. In some implementations, the model trainer 1060 can perform supervised training techniques using a set of labeled training data. In other implementations, the model trainer 1060 can perform unsupervised training techniques using a set of unlabeled training data. The model trainer 1060 can perform a number of generalization techniques to improve the generalization capability of the models being trained. Generalization techniques include weight decays, dropouts, or other techniques.

In particular, the model trainer 1060 can train a machine-learned model 1010 and/or 1040 based on a set of training data 1062. The training data 1062 can include, for example, ground truth data including annotations for sensor data portions and/or vehicle state data. The model trainer 1060 can be implemented in hardware, firmware, and/or software controlling one or more processors.

In some examples, the model trainer 1060 can train a machine-learned model 1010 and/or 1040 configured to generate motion plans including target trajectories as well as intermediate representations associated with one or more of an object detection or an object prediction. In some examples, the machine-learned model 1010 and/or 1040 is trained using sensor data that has been labeled or otherwise annotated as having a correspondence to a detected object, a class of a detected object, etc. By way of example, sensor data collected in association with a particular class of object can be labeled to indicate that it corresponds to an object detection or the particular class. In some instances, the label may be a simple annotation that the sensor data corresponds to a positive training dataset.

The computing system 1002 can also include a network interface 1024 used to communicate with one or more systems or devices, including systems or devices that are remotely located from the computing system 1002. The network interface 1024 can include any circuits, components, software, etc. for communicating with one or more networks (e.g., 1080). In some implementations, the network interface 1024 can include, for example, one or more of a communications controller, receiver, transceiver, transmitter, port, conductors, software and/or hardware for communicating data. Similarly, the machine learning computing system 1030 can include a network interface 1064.

The network(s) 1080 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1080 can be accomplished, for instance, via a network interface using any type of protocol, protection scheme, encoding, format, packaging, etc.

FIG. 14 illustrates one example computing system 1000 that can be used to implement the present disclosure. Other computing systems can be used as well. For example, in some implementations, the computing system 1002 can include the model trainer 1060 and the training data 1062. In such implementations, the machine-learned models 1010 can be both trained and used locally at the computing system 1002. As another example, in some implementations, the computing system 1002 is not connected to other computing systems.

In addition, components illustrated and/or discussed as being included in one of the computing systems 1002 or 1030 can instead be included in another of the computing systems 1002 or 1030. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks, operations, and functions discussed herein as being performed at one computing system herein can instead be performed by another computing system, and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system.

The number and configuration of elements shown in the figures is not meant to be limiting. More or less of those elements and/or different configurations can be utilized in various embodiments.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, comprising:
obtaining data indicative of a target interaction between an autonomous vehicle and a mobile test device in an environment;
obtaining motion planning data generated by an autonomy computing system of the autonomous vehicle while operating within the environment, the motion planning data indicative of a first motion plan, the motion planning data obtained prior to the autonomous vehicle executing the first motion plan;
determining one or more motion parameters for the mobile test device based at least in part on the motion planning data and the data indicative of the target interaction, wherein determining the one or more motion parameters comprises:
determining one or more first motion parameters for the mobile test device to reach an interaction point with the autonomous vehicle at a target time based at least in part on the first motion plan of the autonomous vehicle; and
generating one or more control commands for the mobile test device based at least in part on the one or more motion parameters.

2. The computer-implemented method of claim 1, wherein the one or more control commands are generated by a computing system remotely located from the mobile test device, the method further comprising:
transmitting, from the computing system to the mobile test device, the one or more control commands.

3. The computer-implemented method of claim 1, wherein the one or more control commands are generated by a computing system local with the mobile test device, the method further comprising:
providing, by the computing system, one or more control signals to one or more control devices to control the mobile test device based on the one or more control commands.

4. The computer-implemented method of claim 1, further comprising:
generating the data indicative of the target interaction between the autonomous vehicle and the mobile test device, where the data indicative of the target interaction includes data indicative of at least one of a target geographic location, a target velocity of the mobile test device, or a target orientation of the mobile test device.

5. The computer-implemented method of claim 1, wherein obtaining motion planning data generated by the autonomy computing system of the autonomous vehicle comprises:
   obtaining data indicative of a second motion plan prior to the autonomous vehicle executing the second motion plan;
   wherein the motion planning data indicative of the first motion plan is obtained prior to the data indicative of the second motion plan.

6. The computer-implemented method of claim 5, wherein determining one or more motion parameters for the mobile test device based at least in part on the motion planning data and the data indicative of the target interaction comprises:
   determining one or more second motion parameters for the mobile test device to reach the interaction point with the autonomous vehicle at a target time based at least in part on the second motion plan of the autonomous vehicle, wherein the one or more second motion parameters are determined prior to the autonomous vehicle executing the second motion plan.

7. The computer-implemented method of claim 1, wherein determining one or more motion parameters for the mobile test device based at least in part on the motion planning data and the data indicative of the target interaction comprises:
   determining a motion trajectory for the mobile test device based at least in part on the interaction point and the target time.

8. The computer-implemented method of claim 1, further comprising:
   obtaining motion planning data generated by the autonomy computing system of the autonomous vehicle in association with the targeted interaction;
   comparing the motion planning data with one or more validation criteria for the autonomous vehicle; and
   generating validation data associated with the autonomous vehicle based on comparing the motion planning data with one or more validation criteria.

9. A computing system, comprising:
   one or more processors; and
   one or more non-transitory computer-readable media that store instructions that are executable by the one or more processors to cause the computing system to perform operations, the operations comprising:
      obtaining data indicative of a target interaction between an autonomous vehicle and a mobile test device in an environment;
      obtaining motion planning data generated by an autonomy computing system of the autonomous vehicle while operating within the environment, the motion planning data indicative of a first motion plan, the motion planning data obtained prior to the autonomous vehicle executing the first motion plan;
      determining one or more motion parameters for the mobile test device based at least in part on the motion planning data and the data indicative of the target interaction, wherein determining the one or more motion parameters comprises:
         determining one or more first motion parameters for the mobile test device to reach an interaction point with the autonomous vehicle at a target time based at least in part on the first motion plan of the autonomous vehicle; and
      generating one or more control commands for the mobile test device based at least in part on the one or more motion parameters.

10. The computing system of any of claim 9, wherein the computing system is remotely located from the mobile test device, the operations further comprising:
   transmitting, to the mobile test device, the one or more control commands.

11. The computing system of claim 9, wherein the computing system is local with the mobile test device, the operations further comprising:
   providing one or more control signals to one or more control devices to control the mobile test device based on the one or more control commands.

12. The computing system of claim 9, further comprising:
   generating the data indicative of the target interaction between the autonomous vehicle and the mobile test device, where the data indicative of the target interaction includes data indicative of at least one of a target geographic location, a target velocity of the mobile test device, or a target orientation of the mobile test device.

13. The computing system of claim 9, wherein obtaining motion planning data generated by the autonomy computing system of the autonomous vehicle comprises:
   obtaining data indicative of a second motion plan prior to the autonomous vehicle executing the second motion plan;
   wherein the motion planning data indicative of the first motion plan is obtained prior to the data indicative of the second motion plan.

14. The computing system of claim 13, wherein determining one or more motion parameters for the mobile test device based at least in part on the motion planning data and the data indicative of the target interaction comprises:
   determining one or more second motion parameters for the mobile test device to reach the interaction point with the autonomous vehicle at a target time based at least in part on the second motion plan of the autonomous vehicle, wherein the one or more second motion parameters are determined prior to the autonomous vehicle executing the second motion plan.

15. The computing system of claim 9, wherein determining one or more motion parameters for the mobile test device based at least in part on the motion planning data and the data indicative of the target interaction comprises:
   determining a motion trajectory for the mobile test device based at least in part on the interaction point and the target time.

16. The computing system of claim 9, further comprising:
   obtaining motion planning data generated by the autonomy computing system of the autonomous vehicle in association with the target interaction;
   comparing the motion planning data with one or more validation criteria for the autonomous vehicle; and
   generating validation data associated with the autonomous vehicle based on comparing the motion planning data with one or more validation criteria.

17. A mobile test device for testing autonomous vehicle response to object movement, comprising:
   a device propulsion system;
   one or more communication interfaces;
   one or more processors; and
   one or more non-transitory computer-readable media that store instructions that are executable by the one or more processors to cause the one or more processors to perform operations, the operations comprising:

obtaining motion planning data generated by an autonomy computing system of an autonomous vehicle while operating within an environment, the motion planning data indicative of a first motion plan, the motion planning data obtained prior to the autonomous vehicle executing the first motion plan;

determining one or more motion parameters for the mobile test device based at least in part on the motion planning data, wherein determining the one or more motion parameters comprises:

determining one or more first motion parameters for the mobile test device to reach an interaction point with the autonomous vehicle at a target time based at least in part on the first motion plan of the autonomous vehicle; and providing one or more control signals to the device propulsion system based at least in part on the one or more motion parameters.

18. The mobile test device of claim 17, wherein obtaining motion planning data generated by an autonomy computing system of an autonomous vehicle while operating within an environment comprises:

obtaining data associated with a second motion plan prior to the autonomous vehicle executing the second motion plan;

wherein the motion planning data indicative of the first motion plan is obtained prior to the data indicative of the second motion plan.

19. The mobile test device of claim 18, wherein determining one or more motion parameters for the mobile test device based at least in part on the motion planning data comprises:

determining one or more second motion parameters for the mobile test device to reach the interaction point with the autonomous vehicle at a target time based at least in part on the second motion plan of the autonomous vehicle, wherein the one or more second motion parameters are determined prior to the autonomous vehicle executing the second motion plan.

20. The mobile test device of any of claim 17, wherein determining one or more motion parameters for the mobile test device based at least in part on the motion planning data comprises:

determining a motion trajectory for the mobile test device based at least in part on the interaction point and the target time.

* * * * *